United States Patent
Jacobson et al.

(10) Patent No.: US 10,972,297 B2
(45) Date of Patent: Apr. 6, 2021

(54) DATA PROCESSING SYSTEM WITH MACHINE LEARNING ENGINE TO PROVIDE AUTOMATED COLLABORATION ASSISTANCE FUNCTIONS

(71) Applicant: Bank of America Corporation, Charlotte, NC (US)

(72) Inventors: William P. Jacobson, Matthews, NC (US); Jason D. Latta, Charlotte, NC (US); Jisoo Lee, Chesterfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 946 days.

(21) Appl. No.: 15/412,343

(22) Filed: Jan. 23, 2017

(65) Prior Publication Data
US 2018/0212790 A1   Jul. 26, 2018

(51) Int. Cl.
*G06F 17/00*   (2019.01)
*G06F 7/00*   (2006.01)
(Continued)

(52) U.S. Cl.
CPC ....... *H04L 12/1831* (2013.01); *G06Q 10/103* (2013.01); *G10L 15/07* (2013.01);
(Continued)

(58) Field of Classification Search
CPC ............ H04L 12/1831; H04L 12/1822; G06Q 10/103; G10L 15/07; G10L 15/26;
(Continued)

(56) References Cited

U.S. PATENT DOCUMENTS 6,100,882 A   8/2000   Sharman et al.
7,299,405 B1   11/2007   Lee et al.
(Continued)

OTHER PUBLICATIONS

Jun. 15, 2018 U.S. Non-Final Office Action—U.S. Appl. No. 15/412,415.
(Continued)

*Primary Examiner* — Pavan Mamillapalli
(74) *Attorney, Agent, or Firm* — Banner & Witcoff, Ltd.; Michael A. Springs

(57) ABSTRACT

Aspects of the disclosure relate to implementing and using a data processing system with a machine learning engine to provide automated collaboration assistance functions. A computing platform may receive, from a teleconference hosting computer system, a content stream associated with a teleconference. Responsive to receiving the content stream associated with the teleconference, the computing platform may generate, based on a machine learning dataset, real-time transcript data comprising a real-time textual transcript of the teleconference. The computing platform may receive a request for a summary of the teleconference. Responsive to receiving the request for the summary of the teleconference, the computing platform may generate, based on the real-time transcript data comprising the real-time textual transcript of the teleconference, a summary report of the teleconference. Based on generating the summary report of the teleconference, the computing platform may send the summary report of the teleconference to one or more recipient devices.

19 Claims, 21 Drawing Sheets

(51) Int. Cl.
*H04L 12/18* (2006.01)
*G10L 15/26* (2006.01)
*G06Q 10/10* (2012.01)
*G10L 15/07* (2013.01)
*H04M 3/56* (2006.01)
*G10L 17/00* (2013.01)
*G10L 15/22* (2006.01)

(52) U.S. Cl.
CPC .............. *G10L 15/26* (2013.01); *G10L 15/22* (2013.01); *G10L 17/00* (2013.01); *G10L 2015/223* (2013.01); *H04L 12/1822* (2013.01); *H04M 3/567* (2013.01)

(58) Field of Classification Search
CPC ... G10L 15/22; G10L 17/00; G10L 2015/223; H04M 3/567
USPC ......................................................... 707/805
See application file for complete search history.

(56) References Cited

U.S. PATENT DOCUMENTS

| | | | | |
|---|---|---|---|---|
| 7,337,124 | B2* | 2/2008 | Corral | G06Q 10/06 705/7.17 |
| 7,401,123 | B2* | 7/2008 | Cama | G06Q 10/00 709/206 |
| 8,515,958 | B2 | 8/2013 | Knight | |
| 8,751,559 | B2 | 6/2014 | Richardson et al. | |
| 8,849,907 | B1 | 9/2014 | Hession et al. | |
| 9,024,993 | B2 | 5/2015 | Hession et al. | |
| 9,195,739 | B2 | 11/2015 | Imig et al. | |
| 10,033,831 | B2* | 7/2018 | Barry | G06Q 10/10 |
| 10,304,458 | B1 | 5/2019 | Woo | |
| 2002/0194047 | A1 | 12/2002 | Edinger et al. | |
| 2004/0003071 | A1* | 1/2004 | Mathew | H04L 63/083 709/223 |
| 2004/0122756 | A1* | 6/2004 | Creeden | G06Q 40/00 705/35 |
| 2004/0139053 | A1* | 7/2004 | Haunschild | G06Q 10/10 707/999.001 |
| 2005/0125408 | A1* | 6/2005 | Somaroo | G06F 16/20 707/999.01 |
| 2005/0152523 | A1* | 7/2005 | Fellenstein | H04M 3/565 379/202.01 |
| 2006/0036394 | A1* | 2/2006 | Chen | G01R 31/318511 702/123 |
| 2007/0139212 | A1* | 6/2007 | Kaundinya | G06Q 10/06 340/692 |
| 2009/0240628 | A1* | 9/2009 | Blair | G06Q 30/08 705/80 |
| 2010/0198927 | A1* | 8/2010 | Tonnison | G06Q 10/107 709/206 |
| 2013/0325479 | A1 | 12/2013 | Krueger et al. | |
| 2014/0022328 | A1 | 1/2014 | Gechter et al. | |
| 2014/0033071 | A1* | 1/2014 | Gruber | G06Q 10/06311 715/752 |
| 2014/0071287 | A1* | 3/2014 | Tu | G06K 9/00771 348/150 |
| 2014/0365200 | A1 | 12/2014 | Sagie | |
| 2015/0227941 | A1 | 8/2015 | Tuchman et al. | |
| 2016/0073054 | A1* | 3/2016 | Balasaygun | H04L 12/1813 348/14.08 |
| 2016/0080165 | A1 | 3/2016 | Ehsani et al. | |
| 2016/0099843 | A1 | 4/2016 | Krishnamoorthy et al. | |
| 2016/0287869 | A1 | 10/2016 | Errico et al. | |
| 2016/0291966 | A1 | 10/2016 | Johnson | |
| 2016/0300234 | A1 | 10/2016 | Moss-Pultz et al. | |
| 2016/0301771 | A1 | 10/2016 | Choudhari et al. | |
| 2016/0301813 | A1 | 10/2016 | Swire et al. | |
| 2016/0302017 | A1 | 10/2016 | Risberg et al. | |
| 2016/0303097 | A1 | 10/2016 | Pardo et al. | |
| 2016/0307456 | A1 | 10/2016 | Harward | |
| 2016/0309004 | A9 | 10/2016 | Goranson | |
| 2016/0317077 | A1 | 11/2016 | Sillay | |
| 2016/0319569 | A1 | 11/2016 | Johnson et al. | |
| 2016/0321529 | A1 | 11/2016 | Rujan | |
| 2016/0321936 | A1 | 11/2016 | Laine et al. | |
| 2016/0328952 | A1 | 11/2016 | Will et al. | |
| 2016/0335632 | A1 | 11/2016 | Proud et al. | |
| 2016/0337799 | A1 | 11/2016 | Johnson | |
| 2016/0342756 | A1 | 11/2016 | Wall | |
| 2016/0342882 | A1 | 11/2016 | Proud et al. | |
| 2016/0350884 | A1 | 12/2016 | Greenberg et al. | |
| 2016/0350886 | A1 | 12/2016 | Jessen et al. | |
| 2016/0353240 | A1 | 12/2016 | Rappaport | |
| 2016/0357281 | A1 | 12/2016 | Fleizach et al. | |
| 2016/0358063 | A1 | 12/2016 | Proud et al. | |
| 2016/0358155 | A1 | 12/2016 | Proud et al. | |
| 2016/0358156 | A1 | 12/2016 | Proud et al. | |
| 2016/0358598 | A1 | 12/2016 | Williams et al. | |
| 2016/0359831 | A1 | 12/2016 | Berlin et al. | |
| 2016/0360336 | A1 | 12/2016 | Gross et al. | |
| 2016/0360379 | A1 | 12/2016 | Cherry et al. | |
| 2016/0360382 | A1 | 12/2016 | Gross et al. | |
| 2016/0361009 | A1 | 12/2016 | Proud et al. | |
| 2016/0366556 | A1 | 12/2016 | Chowdhury et al. | |
| 2016/0373891 | A1 | 12/2016 | Ramer et al. | |
| 2016/0378747 | A1 | 12/2016 | Orr et al. | |
| 2016/0380878 | A1 | 12/2016 | Bugenhagen et al. | |
| 2017/0004844 | A1 | 1/2017 | Short et al. | |
| 2017/0008097 | A1 | 1/2017 | Marsh et al. | |
| 2017/0011131 | A1 | 1/2017 | Li et al. | |
| 2017/0011179 | A1 | 1/2017 | Arshad et al. | |
| 2017/0011188 | A1 | 1/2017 | Arshad et al. | |
| 2017/0011192 | A1 | 1/2017 | Arshad et al. | |
| 2017/0011193 | A1 | 1/2017 | Arshad et al. | |
| 2017/0011194 | A1 | 1/2017 | Arshad et al. | |
| 2017/0011195 | A1 | 1/2017 | Arshad et al. | |
| 2017/0011196 | A1 | 1/2017 | Arshad et al. | |
| 2017/0011200 | A1 | 1/2017 | Arshad et al. | |
| 2017/0011330 | A1 | 1/2017 | Mishra et al. | |
| 2017/0013188 | A1 | 1/2017 | Kothari | |
| 2017/0016249 | A1 | 1/2017 | Johnson et al. | |
| 2017/0019378 | A1 | 1/2017 | Johnson et al. | |
| 2017/0091696 | A1 | 3/2017 | Funakoshi et al. | |
| 2017/0277784 | A1* | 9/2017 | Hay | H04L 65/403 |
| 2018/0113854 | A1 | 4/2018 | Vig et al. | |
| 2018/0191907 | A1* | 7/2018 | Herrin | G10L 15/26 |
| 2018/0262619 | A1 | 9/2018 | Yarnell | |

OTHER PUBLICATIONS

Jan. 28, 2019 U.S. Notice of Allowance and Fees Due—U.S. Appl. No. 15/412,415.
Oct. 1, 2019 U.S. Non-Final Office Action—U.S. Appl. No. 15/412,349.
Feb. 21, 2020 U.S. Final Office Action—U.S. Appl. No. 15/412,349.
Jun. 23, 2020 U.S. Non-Final Office Action—U.S. Appl. No. 15/412,349.

* cited by examiner

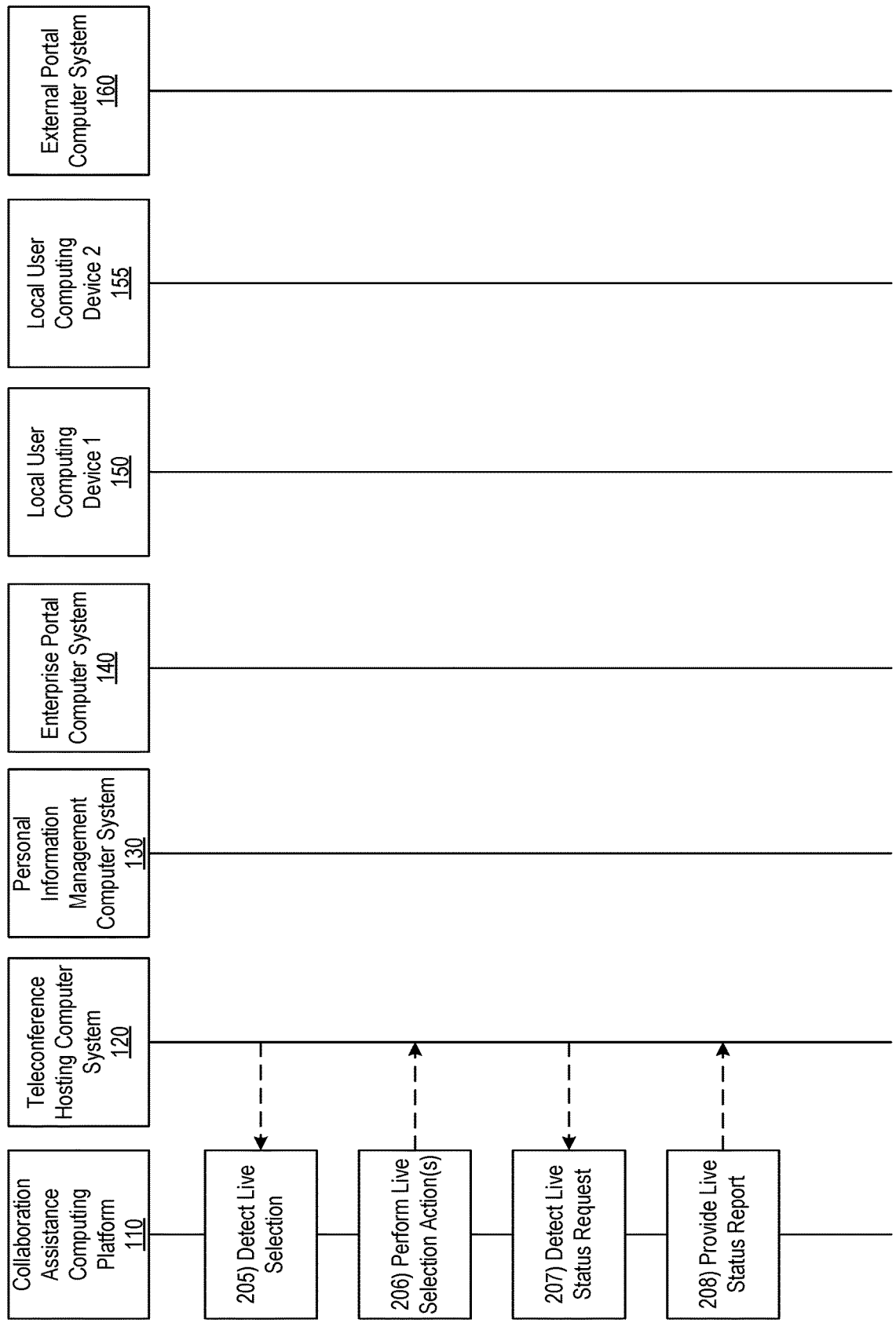

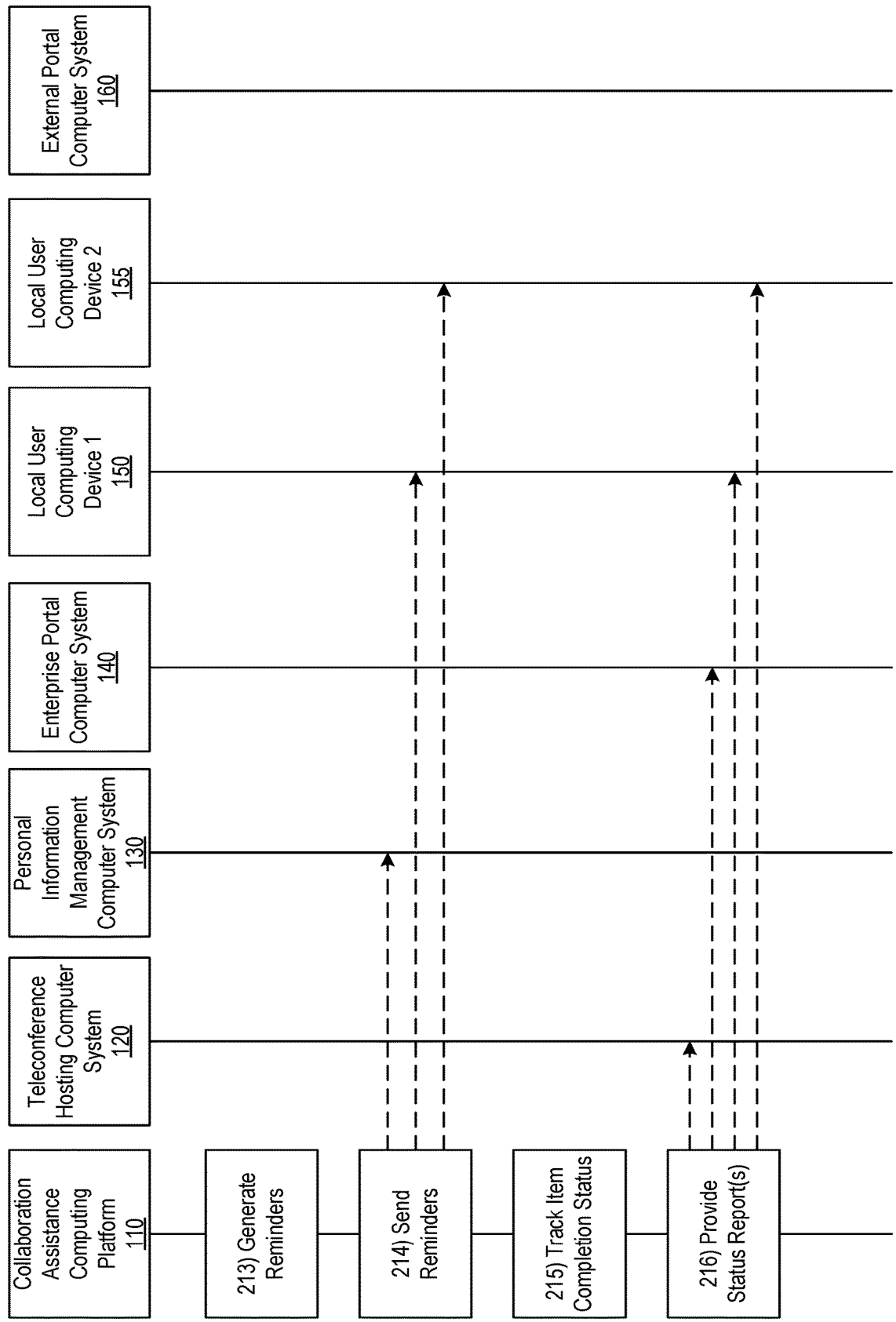

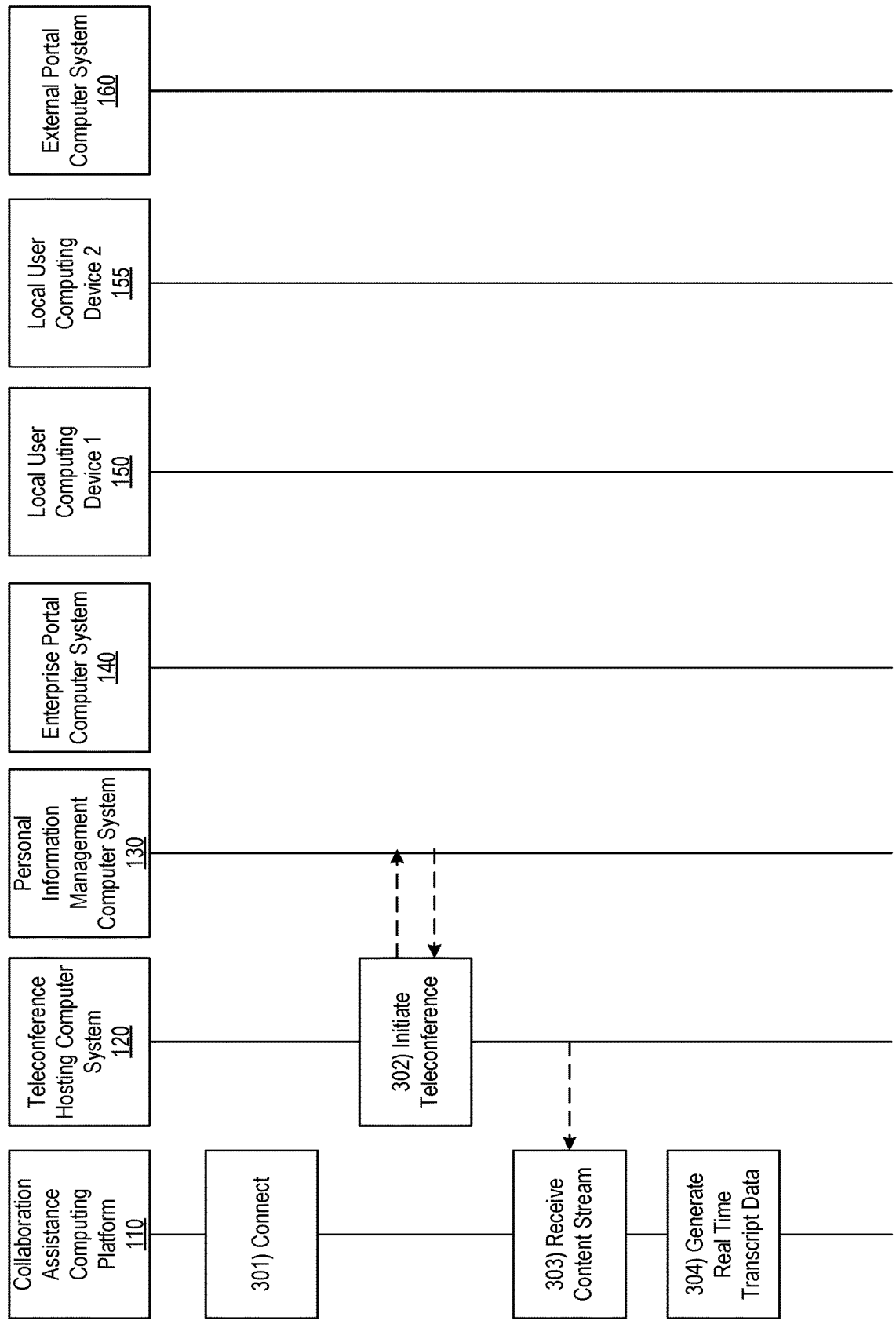

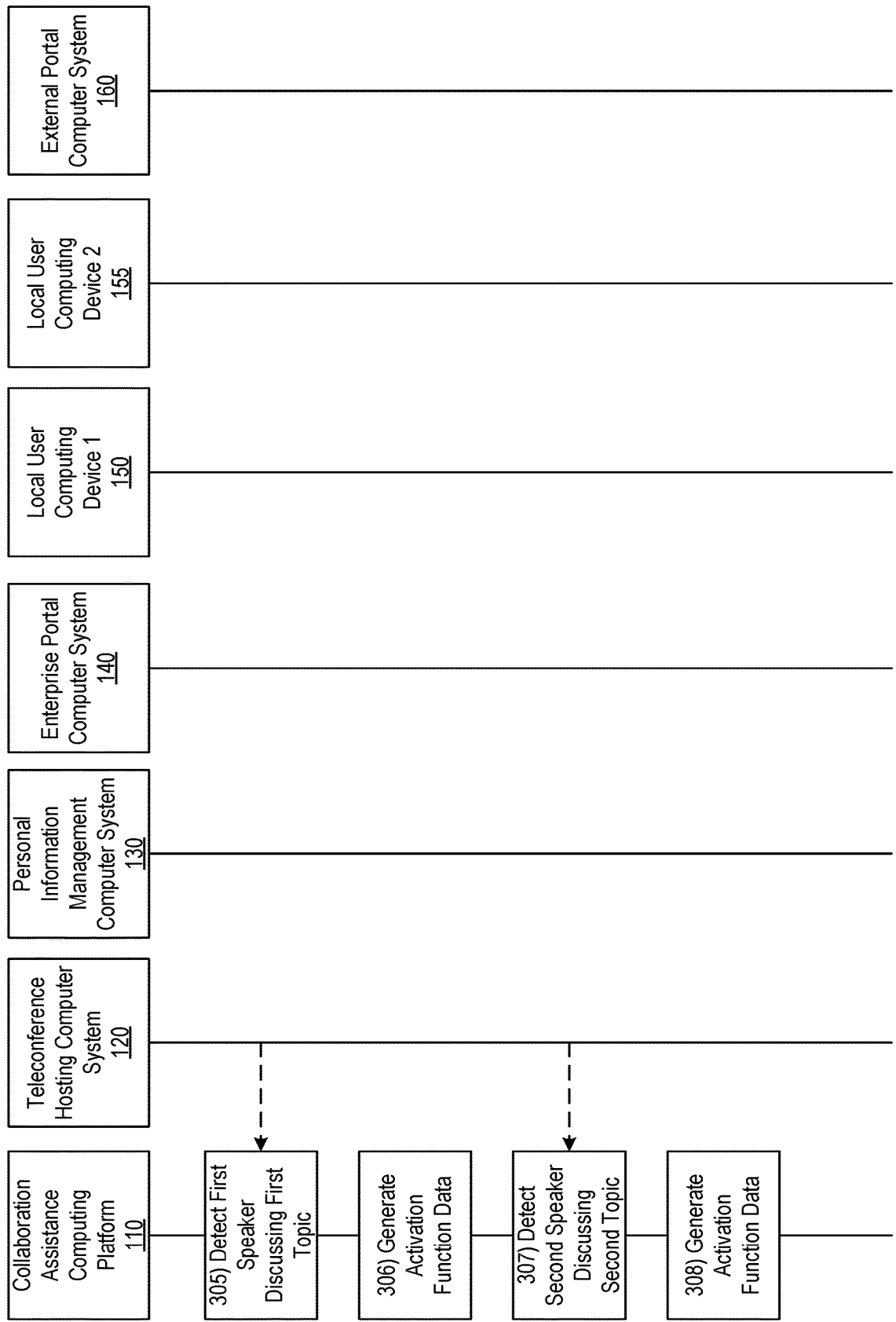

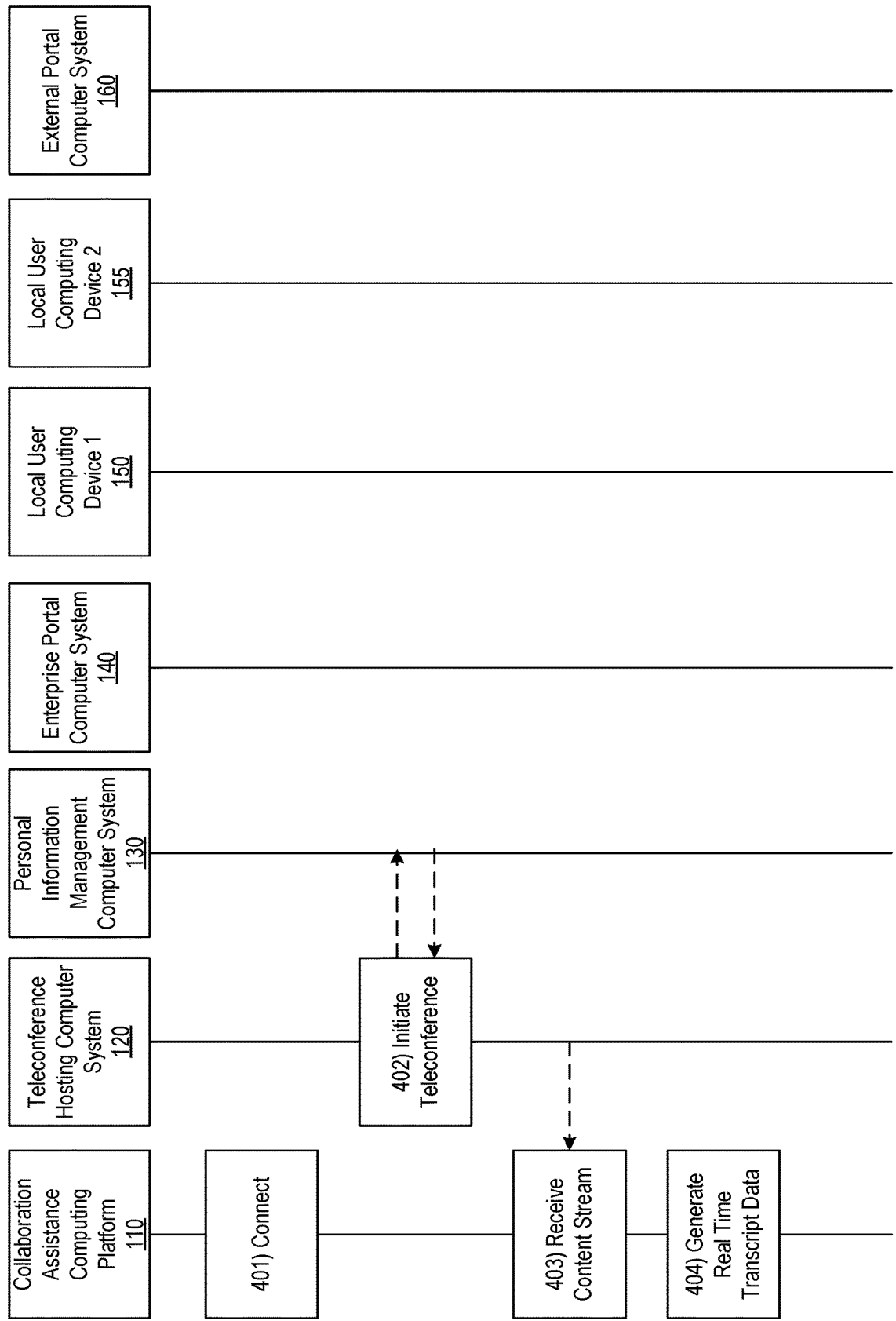

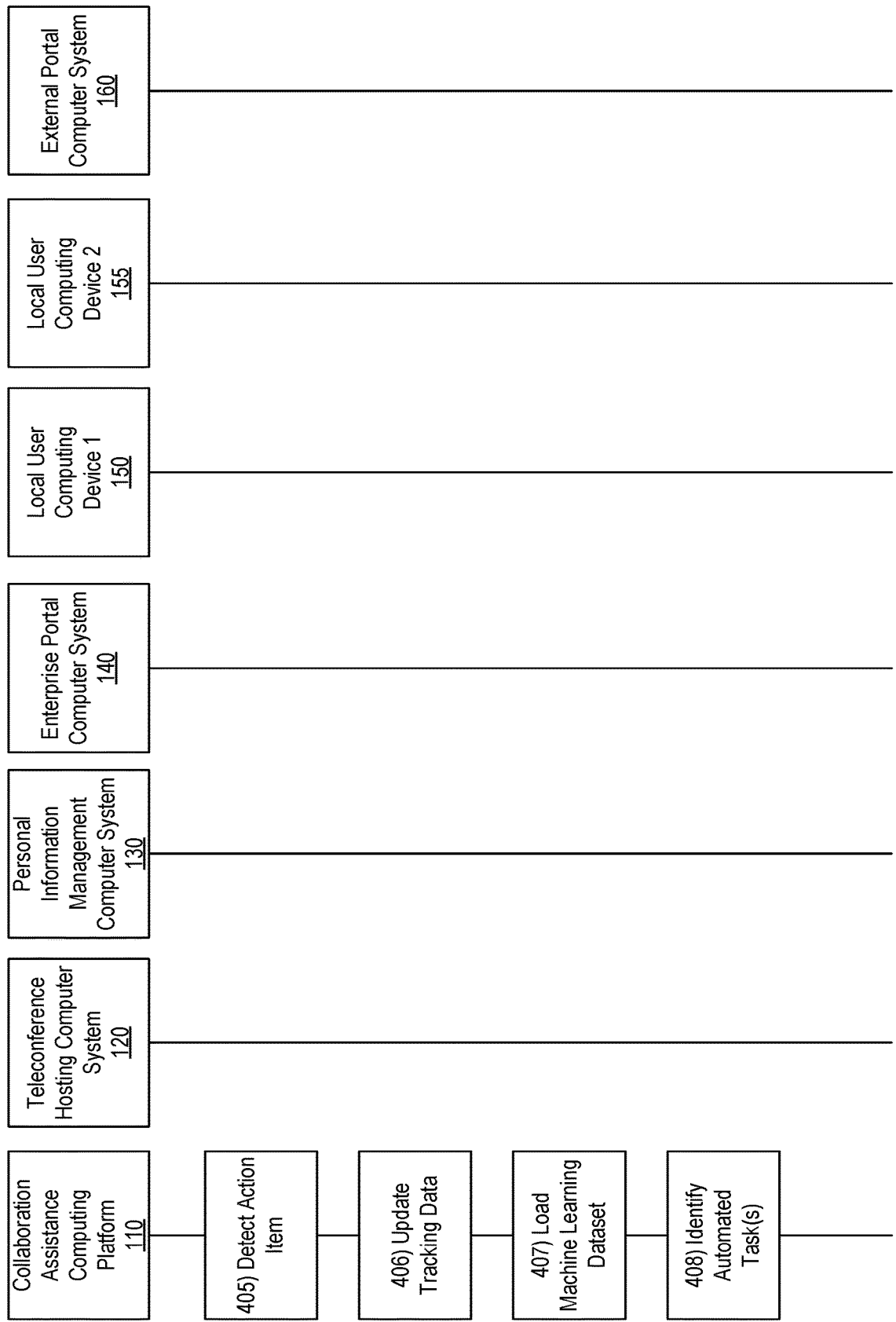

Collaboration Assistance Computing Platform
*Subject Matter Expert Invitation*

You have been identified as a subject matter expert in Topic A.

A teleconference related to Topic A is occurring on <Date> at <Time>.

Please respond to advise if you will be able to attend.

Accept | Decline | More Options

Back | Next

FIG. 7

Collaboration Assistance Computing Platform
*Validate Subject Matter Expert Identification*

Subject Matter Expert Need(s) Identified – Topic A, Topic B, ...

Expert(s) Invited – Expert A, Expert B, ...

Edit Needs | Edit Experts | More Options

Back | Validate

FIG. 8

DATA PROCESSING SYSTEM WITH MACHINE LEARNING ENGINE TO PROVIDE AUTOMATED COLLABORATION ASSISTANCE FUNCTIONS

BACKGROUND

Aspects of the disclosure relate to electrical computers, data processing systems, and machine learning. In particular, one or more aspects of the disclosure relate to implementing and using a data processing system with a machine learning engine to provide automated collaboration assistance functions.

Large enterprise organizations may deploy, operate, maintain, and use many different computer systems, which may provide many different services to various affiliated entities associated with a given computing environment. As new computer systems and services are introduced and the technical complexity of such a computing environment grows, it may become increasingly difficult for network administrators, organization employees, and other affiliated entities to optimize, maintain, and/or otherwise utilize such computer systems and services, particularly in instances in which different entities may need to collaboratively use such systems and services.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for implementing and using a data processing system with a machine learning engine to provide automated collaboration assistance functions.

In accordance with one or more embodiments, a computing platform having at least one processor, a memory, and a communication interface may receive, via the communication interface, from a teleconference hosting computer system, a first content stream associated with a first teleconference. Responsive to receiving the first content stream associated with the first teleconference from the teleconference hosting computer system, the computing platform may generate, based on a machine learning dataset, first real-time transcript data comprising a real-time textual transcript of the first teleconference. Subsequently, the computing platform may receive a request for a summary of the first teleconference. Responsive to receiving the request for the summary of the first teleconference, the computing platform may generate, based on the first real-time transcript data comprising the real-time textual transcript of the first teleconference, a summary report of the first teleconference. Based on generating the summary report of the first teleconference, the computing platform may send, via the communication interface, the summary report of the first teleconference to one or more recipient devices.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference.

In some embodiments, the machine learning dataset may include organization-specific vocabulary information, team-specific vocabulary information, and individual-specific speech pattern information. In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data.

In some embodiments, receiving the request for the summary of the first teleconference may include receiving the request for the summary of the first teleconference from a participant of the first teleconference while the first teleconference is in progress. In some embodiments, receiving the request for the summary of the first teleconference may include receiving the request for the summary of the first teleconference after the first teleconference has concluded. In some embodiments, receiving the request for the summary of the first teleconference may include receiving the request for the summary of the first teleconference from the teleconference hosting computer system based on the first teleconference being terminated.

In some embodiments, generating the summary report of the first teleconference may include generating the summary report of the first teleconference based on one or more summary preferences specifying a target length for the summary report of the first teleconference, one or more prioritized topics for the summary report of the first teleconference, and one or more prioritized speakers for the summary report of the first teleconference.

In some embodiments, sending the summary report of the first teleconference to one or more recipient devices may include sending the summary report of the first teleconference to the teleconference hosting computer system. In some embodiments, sending the summary report of the first teleconference to one or more recipient devices may include sending the summary report of the first teleconference to one or more email recipient user devices.

In some embodiments, the computing platform may detect, during the first teleconference, a live selection of a tracking service provided by the computing platform. Based on detecting the live selection of the tracking service provided by the computing platform, the computing platform may perform one or more live selection actions.

In some embodiments, the computing platform may detect, during the first teleconference, a request for a live status report from a tracking service provided by the computing platform. Based on detecting the request for the live status report from the tracking service provided by the computing platform, the computing platform may provide live status report information associated with one or more items being tracked by the tracking service provided by the computing platform.

In some embodiments, after generating the summary report of the first teleconference, the computing platform may validate the summary report of the first teleconference generated by the computing platform. Subsequently, the computing platform may update the machine learning dataset based on validating the summary report of the first teleconference generated by the computing platform.

In some embodiments, the computing platform may generate one or more reminders associated with one or more items being tracked by a tracking service provided by the computing platform. Subsequently, the computing platform may send, via the communication interface, the one or more reminders associated with the one or more items being tracked by the tracking service provided by the computing platform to at least one recipient device.

In some embodiments, the computing platform may identify a completion status of at least one item being tracked by the tracking service provided by the computing platform based on item status information received by the computing platform from one or more user devices. Responsive to identifying the completion status of the at least one item being tracked by the tracking service provided by the computing platform, the computing platform may provide a status report to at least one user device.

In accordance with one or more additional embodiments, a computing platform having at least one processor, a memory, and a communication interface may receive, via the communication interface, from a teleconference hosting computer system, a first content stream associated with a first teleconference. Responsive to receiving the first content stream associated with the first teleconference from the teleconference hosting computer system, the computing platform may generate, based on a machine learning dataset, first real-time transcript data comprising a real-time textual transcript of the first teleconference. Subsequently, the computing platform may identify one or more subject matter experts associated with one or more topics by processing the first real-time transcript data using at least one activation function. Then, the computing platform may update the machine learning dataset based on identifying the one or more subject matter experts associated with the one or more topics.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference.

In some embodiments, the machine learning dataset may include organization-specific vocabulary information, team-specific vocabulary information, and individual-specific speech pattern information. In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data.

In some embodiments, prior to identifying the one or more subject matter experts associated with the one or more topics, the computing platform may detect, during the first teleconference, a first speaker discussing a first topic. Responsive to detecting the first speaker discussing the first topic, the computing platform may generate first activation function data based on detecting the first speaker discussing the first topic. Subsequently, the computing platform may detect, during the first teleconference, a second speaker discussing a second topic. Responsive to detecting the second speaker discussing the second topic, the computing platform may generate second activation function data based on detecting the second speaker discussing the second topic.

In some embodiments, the computing platform may identify, based on the machine learning data set, a need for a subject matter expert in a first topic. Responsive to identifying the need for the subject matter expert in the first topic, the computing platform may identify, based on the machine learning data set, at least one available subject matter expert associated with the first topic. Responsive to identifying the at least one available subject matter expert associated with the first topic, the computing platform may generate at least one subject matter expert invitation for the at least one available subject matter expert associated with the first topic. Subsequently, the computing platform may send the at least one subject matter expert invitation to the at least one available subject matter expert associated with the first topic, and the at least one subject matter expert invitation may invite the at least one available subject matter expert associated with the first topic to a teleconference associated with the need for the subject matter expert in the first topic. Thereafter, the computing platform may receive a first response from a first subject matter expert accepting the at least one subject matter expert invitation. Then, the computing platform may connect the first subject matter expert to the teleconference associated with the need for the subject matter expert in the first topic.

In some embodiments, identifying the need for the subject matter expert in the first topic may include identifying the need for the subject matter expert in the first topic during the first teleconference. In some embodiments, identifying the need for the subject matter expert in the first topic may include identifying the need for the subject matter expert in the first topic during a second teleconference different from the first teleconference.

In some embodiments, identifying the need for the subject matter expert in the first topic may include identifying the need for the subject matter expert in the first topic based on previous conversation patterns associated with one or more speakers participating in the first teleconference. In some embodiments, identifying the need for the subject matter expert in the first topic may include identifying the need for the subject matter expert in the first topic based on calendar information associated with one or more speakers participating in the first teleconference. In some embodiments, identifying the need for the subject matter expert in the first topic may include receiving a request for a subject matter expert in the first topic from at least one person participating in the first teleconference.

In some embodiments, after connecting the first subject matter expert to the teleconference associated with the need for the subject matter expert in the first topic, the computing platform may validate the need for the subject matter expert in the first topic identified by the computing platform. Subsequently, the computing platform may update the machine learning dataset based on validating the need for the subject matter expert in the first topic identified by the computing platform.

In some embodiments, after updating the machine learning dataset based on validating the need for the subject matter expert in the first topic identified by the computing platform, the computing platform may identify, based on the machine learning data set, a need for a subject matter expert in a second topic. Responsive to identifying the need for the subject matter expert in the second topic, the computing platform may generate, based on the machine learning dataset, at least one subject matter expert invitation for at least one available subject matter expert associated with the second topic.

In accordance with one or more additional embodiments, a computing platform having at least one processor, a memory, and a communication interface may receive, via the communication interface, from a teleconference hosting computer system, a first content stream associated with a first teleconference. Responsive to receiving the first content stream associated with the first teleconference from the teleconference hosting computer system, the computing platform may generate, based on a machine learning dataset, first real-time transcript data comprising a real-time textual transcript of the first teleconference. Subsequently, the computing platform may detect, during the first teleconference, based on the first real-time transcript data comprising the real-time textual transcript of the first teleconference, a first action item associated with the first teleconference. Responsive to detecting the first action item associated with the first teleconference, the computing platform may identify, based on the machine learning dataset, one or more automated tasks associated with the first action item associated with the first teleconference. Responsive to identifying the one or more automated tasks associated with the first action item associated with the first teleconference, the computing platform may execute the one or more automated tasks associated with the first action item associated with the first teleconference.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference.

In some embodiments, the machine learning dataset may include organization-specific vocabulary information, team-specific vocabulary information, and individual-specific speech pattern information. In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data.

In some embodiments, the machine learning dataset may include organization-specific task automation training data linking one or more action items to one or more tasks performable by the computing platform. In some embodiments, detecting the first action item associated with the first teleconference may include detecting an explicit assignment of at least one automated task to the computing platform. In some embodiments, detecting the first action item associated with the first teleconference may include detecting an implicit assignment of at least one automated task to a person participating in the first teleconference.

In some embodiments, executing the one or more automated tasks associated with the first action item associated with the first teleconference may include generating at least one suggested email response. In some embodiments, executing the one or more automated tasks associated with the first action item associated with the first teleconference may include filling out at least one form document. In some embodiments, executing the one or more automated tasks associated with the first action item associated with the first teleconference may include communicating with at least one external service provider using an application programming interface. In some embodiments, executing the one or more automated tasks associated with the first action item associated with the first teleconference may include communicating with at least one internal portal to submit one or more internal requests.

In some embodiments, after executing the one or more automated tasks associated with the first action item associated with the first teleconference, the computing platform may generate at least one task completion notification indicating that the one or more automated tasks associated with the first action item associated with the first teleconference have been executed. Subsequently, the computing platform may send, via the communication interface, to at least one recipient device, the at least one task completion notification indicating that the one or more automated tasks associated with the first action item associated with the first teleconference have been executed.

In some embodiments, after executing the one or more automated tasks associated with the first action item associated with the first teleconference, the computing platform may validate execution of the one or more automated tasks associated with the first action item associated with the first teleconference. Subsequently, the computing platform may update the machine learning dataset based on validating the execution of the one or more automated tasks associated with the first action item associated with the first teleconference.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing and using a data processing system with a machine learning engine to provide automated collaboration assistance functions in accordance with one or more example embodiments;

FIGS. 3A-3E depict another illustrative event sequence for implementing and using a data processing system with a machine learning engine to provide automated collaboration assistance functions in accordance with one or more example embodiments;

FIGS. 4A-4C depict another illustrative event sequence for implementing and using a data processing system with a machine learning engine to provide automated collaboration assistance functions in accordance with one or more example embodiments;

FIGS. 5-10 depict example graphical user interfaces for implementing and using a data processing system with a machine learning engine to provide automated collaboration assistance functions in accordance with one or more example embodiments;

DETAILED DESCRIPTION

Figure 1A:
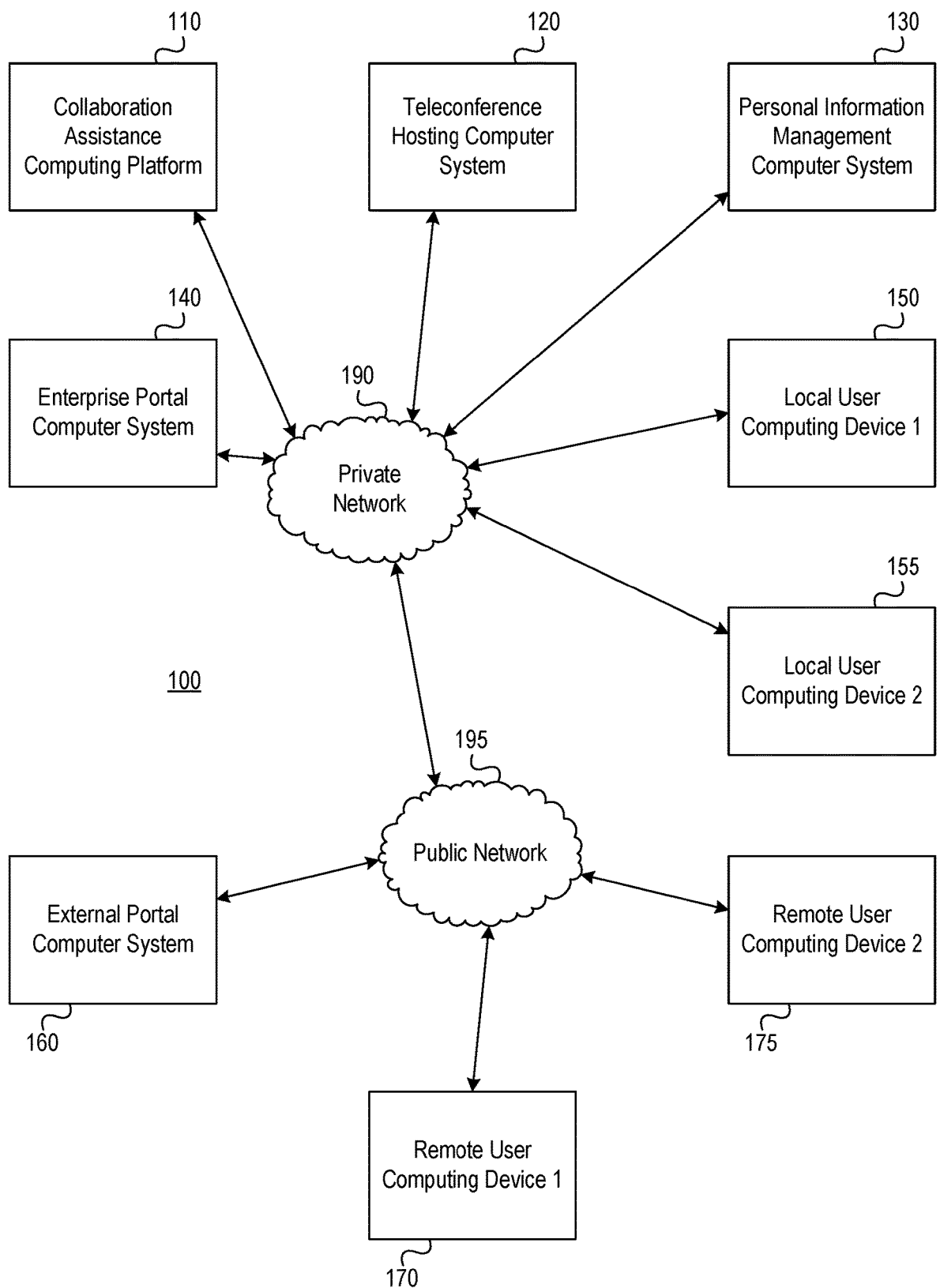
FIGS. 1A and 1B depict an illustrative computing environment for implementing and using a data processing system with a machine learning engine to provide automated collaboration assistance functions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to provide an automated teleconference agent. In some instances, the automated teleconference agent may capture and/or organize a conversation by topic, and the automated teleconference agent may be called on by name and given action verb commands (e.g., "assign action item X to person Y"). In some instances, the automated teleconference agent may automatically identify and/or invite one or more appropriate subject matter experts and/or other personnel to a call. In some instances, the automated teleconference agent may scan one or more internal portals and/or automate a request submission process to assist with follow-up tasks associated with a call.

In one or more arrangements, a machine learning system may be attached to a collaborative effort (e.g., particularly meetings, but also to email threads or other forms of collaboration) and record discussions, including identifying who was speaking or authoring each exchange in a collaborative setting. The system may save the exchange to a database to perform natural language processing. From the discussion, key concepts may be identified and a subject matter expert (SME) metric may be calculated that associates each person in the setting to the concept. The metric may be based on who is speaking at the time the concept was mentioned, who else speaks close in temporal proximity (or alternatively, number of words proximity) to the mention of the concept, and how often the concept is mentioned. For example, a person who speaks immediately following someone else who mentions a particular concept may themselves have a higher SME metric for the concept than someone else who speaks even later on. Each mention of the concept may essentially create a decaying impulse function which dies off over time or is boosted with each subsequent mention. People speaking at various times may be associated with the concept as SMEs based on the strength of the concept's activation at that time. Mathematically, the person's SME metric for the concept may be proportional to the integral of the activation function for the concept during the time the person is speaking. Even people who are present, but are not speaking, may receive a small association with the concept by virtue of being present at the meeting (or, e.g., copied on an email thread). In addition, a second concept that may be highly related to the first concept (e.g., because the two concepts are often mentioned close in time to one another, or based on an external system which proposes the two concepts are synonyms or otherwise related) may receive an activation boost that is smaller than the activation boost to the first concept so that SME's associated with the second concept are also, to a lesser extent, identified as SMEs for the first concept. At any time, when requested, the system may suggest additional people to include in the current or future meeting. The system may be queried for SMEs at the time a collaboration session is scheduled or when an email is drafted.

In one or more arrangements, frequency and proximity of spoken or written tokens (e.g., concepts, keywords, and key phrases) may be used to generate an activation function for a concept and an SME metric for each potential subject matter expert. Over time, as SMEs engage in meetings, exchanges, and/or collaborations where a particular concept and/or keyword is discussed, their SME metric for that concept may increase. Additionally or alternatively, an activation function that increases and decays over time as a speech conversation or text and/or email progresses may be used. In some instances, a second decay rate may be applied to an SME's distance to a concept over time so that active SMEs are preferred over inactive ones. When a concept is discussed in a new setting, the SMEs (e.g., those with shortest distance to the concept) may be determined in real time and proposed as resources for the current or future meeting.

Figure 1B:
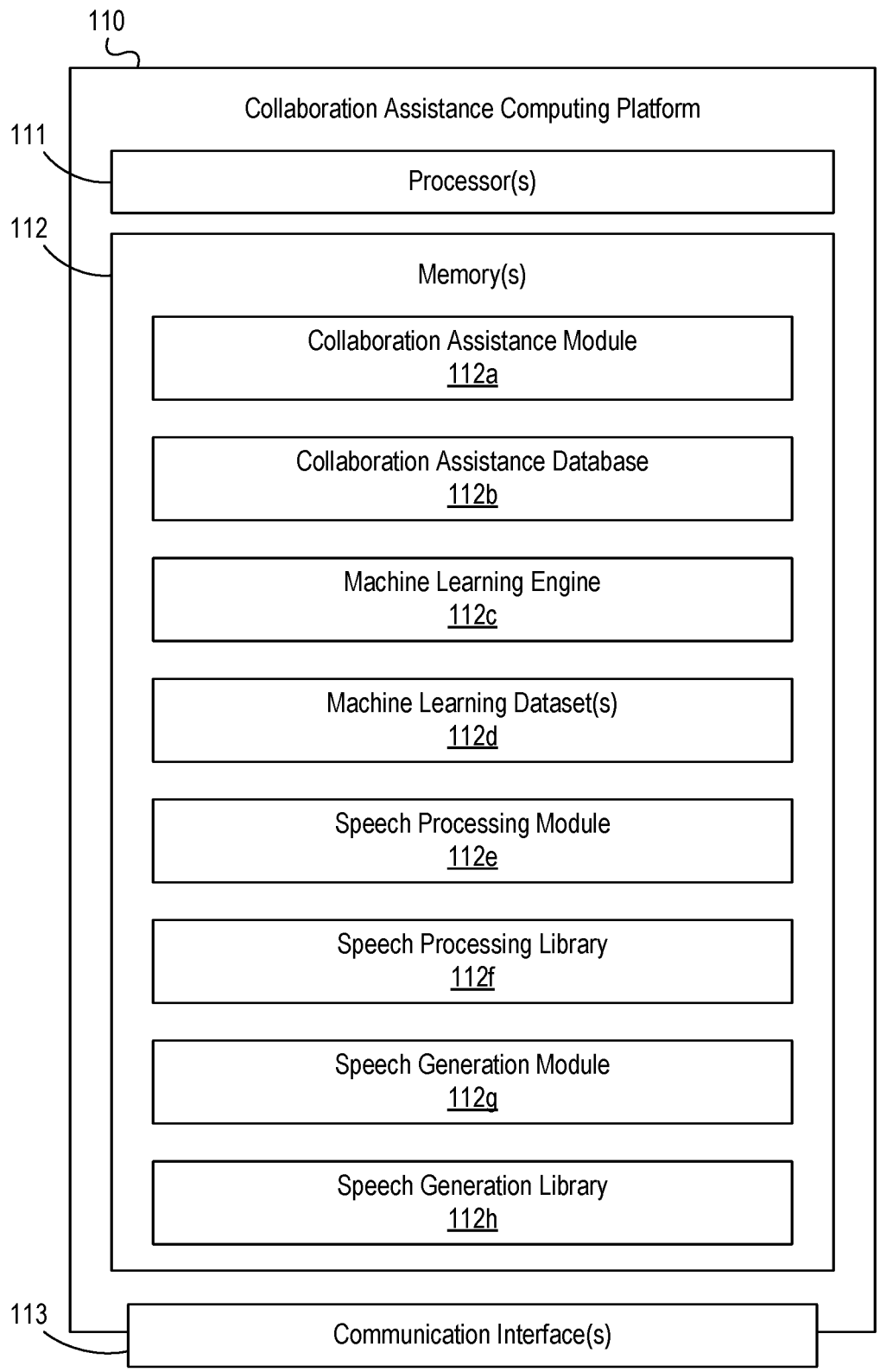

FIGS. 1A and 1B depict an illustrative computing environment for implementing and using a data processing system with a machine learning engine to provide automated collaboration assistance functions in accordance with one or more example embodiments. Referring to FIG. 1A, computing environment 100 may include one or more computing devices and/or other computer systems. For example, computing environment 100 may include a collaboration assistance computing platform 110, a teleconference hosting computer system 120, a personal information management computer system 130, an enterprise portal computer system 140, a first local user computing device 150, a second local user computing device 155, an external portal computer system 160, a first remote user computing device 170, and a second remote user computing device 175.

Collaboration assistance computing platform 110 may be configured to host and/or execute a machine learning engine to provide automated collaboration assistance functions, as discussed in greater detail below. In some instances, collaboration assistance computing platform 110 may monitor one or more teleconferences, generate real-time transcript data associated with the one or more monitored teleconferences, generate and/or provide summary reports associated with the one or more monitored teleconferences, automatically identify and/or invite one or more subject matter experts to the one or more monitored teleconferences based on the real-time transcript data associated with the one or more monitored teleconferences, and/or automatically identify and/or execute one or more automated tasks associated with the one or more monitored teleconferences.

Teleconference hosting computer system 120 may be configured to host one or more teleconferences (which may, e.g., include one or more participants associated with an organization operating collaboration assistance computing platform 110 and/or teleconference hosting computer system 120 and/or one or more participants not associated with an organization operating collaboration assistance computing platform 110 and/or teleconference hosting computer system 120). The one or more teleconferences hosted by teleconference hosting computer system 120 may include audio channels, video channels, text channels, and/or other channels, and teleconference hosting computer system 120 may provide audio data, video data, text data, and/or other data to collaboration assistance computing platform 110 and/or one or more other systems and/or devices to facilitate such teleconferences and/or to facilitate monitoring of the one or more teleconferences by collaboration assistance computing platform 110.

Personal information management computer system 130 may be configured to store, update, and/or maintain mail information, calendar information, task information, contacts information, notes information, and/or other personal information associated with one or more individual users. For example, personal information management computer system 130 may provide an enterprise personal information management service that stores, updates, and/or maintains such information for one or more enterprise users associated with an organization operating collaboration assistance computing platform 110 and/or teleconference hosting computer system 120.

Enterprise portal computer system 140 may be configured to host and/or otherwise provide one or more portals and/or associated web pages to one or more users. For example, enterprise portal computer system 140 may host one or more internal portals and may provide one or more internal portal user interfaces associated with the one or more internal portals to one or more enterprise users associated with an organization operating collaboration assistance computing platform 110 and/or teleconference hosting computer system 120. Local user computing device 150 may be configured to be used by a first local user, such as a first enterprise user associated with an organization operating collaboration assistance computing platform 110 and/or teleconference hosting computer system 120. Local user computing device 155 may be configured to be used by a second local user different from the first local user, such as a second enterprise user associated with an organization operating collaboration assistance computing platform 110 and/or teleconference hosting computer system 120. In some instances, local user computing device 150 and/or local user computing device 155 may be registered with an organization operating collaboration assistance computing platform 110 and/or teleconference hosting computer system 120, such that the organization and/or one or more computer systems associated with the organization may maintain one or more records linking local user computing device 150 and/or local user computing device 155 to one or more specific users (e.g., to enable push notifications and/or other services associated with one or more teleconferences to be provided to the one or more specific users).

External portal computer system 160 may be configured to host and/or otherwise provide one or more portals and/or associated web pages to one or more users. For example, external portal computer system 160 may host one or more external portals and may provide one or more external portal user interfaces associated with the one or more external portals to one or more enterprise users associated with an organization operating collaboration assistance computing platform 110 and/or teleconference hosting computer system 120. Additionally or alternatively, external portal computer system 160 may provide one or more external portal user interfaces associated with the one or more external portals to one or more non-enterprise users who are not associated with an organization operating collaboration assistance computing platform 110 and/or teleconference hosting computer system 120. Remote user computing device 170 may be configured to be used by a first remote user, such as a first remote user not associated with an organization operating collaboration assistance computing platform 110 and/or teleconference hosting computer system 120. Remote user computing device 175 may be configured to be used by a second remote user different from the first remote user, such as a second remote user not associated with an organization operating collaboration assistance computing platform 110 and/or teleconference hosting computer system 120. In some instances, remote user computing device 170 and/or remote user computing device 175 may be registered with an organization operating collaboration assistance computing platform 110 and/or teleconference hosting computer system 120, such that the organization and/or one or more computer systems associated with the organization may maintain one or more records linking remote user computing device 170 and/or remote user computing device 175 to one or more specific users (e.g., to enable push notifications and/or other services associated with one or more teleconferences to be provided to the one or more specific users).

In one or more arrangements, teleconference hosting computer system 120, personal information management computer system 130, enterprise portal computer system 140, local user computing device 150, local user computing device 155, external portal computer system 160, remote user computing device 170, and remote user computing device 175 may be any type of computing device capable of receiving a user interface, receiving input via the user interface, and communicating the received input to one or more other computing devices. For example, teleconference hosting computer system 120, personal information management computer system 130, enterprise portal computer system 140, local user computing device 150, local user computing device 155, external portal computer system 160, remote user computing device 170, and remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of teleconference hosting computer system 120, personal information management computer system 130, enterprise portal computer system 140, local user computing device 150, local user computing device 155, external portal computer system 160, remote user computing device 170, and remote user computing device 175 may, in some instances, be special-purpose computing devices configured to perform specific functions.

Computing environment 100 also may include one or more computing platforms. For example, and as noted above, computing environment 100 may include collaboration assistance computing platform 110. As illustrated in greater detail below, collaboration assistance computing platform 110 may include one or more computing devices configured to perform one or more of the functions described herein. For example, collaboration assistance computing platform 110 may include one or more computers (e.g., laptop computers, desktop computers, servers, server blades, or the like).

Computing environment 100 also may include one or more networks, which may interconnect one or more of collaboration assistance computing platform 110, teleconference hosting computer system 120, personal information management computer system 130, enterprise portal computer system 140, local user computing device 150, local user computing device 155, external portal computer system 160, remote user computing device 170, and remote user computing device 175. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, collaboration assistance computing platform 110, teleconference hosting computer system 120, personal information management computer system 130, enterprise portal computer system 140, local user computing device 150, and local user computing device 155 may be associated with an organization (e.g., a financial institution), and private network 190 may be associated with and/or operated by the organization, and may include one or more networks (e.g., LANs, WANs, virtual private networks (VPNs), or the like) that interconnect collaboration assistance computing platform 110, teleconference hosting computer system 120, personal information management computer system 130, enterprise portal computer system 140, local user computing device 150, and local user computing device 155 and one or more other computing devices and/or computer systems that are used by, operated by, and/or otherwise associated with the organization. Public network 195 may connect private network 190 and/or one or more computing devices connected thereto (e.g., collaboration assistance computing platform 110, teleconference hosting computer system 120, personal information management computer system 130, enterprise portal computer system 140, local user computing device 150, and local user computing device 155) with one or more networks and/or computing devices that are not associated with the organization. For example, external portal computer system 160, remote user computing device 170, and remote user computing device 175 might not be associated with an organization that operates private network 190 (e.g., because external portal computer system 160, remote user computing device 170, and remote user computing device 175 may be owned, operated, and/or serviced by one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect external portal computer system 160, remote user computing device 170, and remote user computing device 175 to private network 190 and/or one or more computing devices connected thereto (e.g., collaboration assistance computing platform 110, teleconference hosting computer system 120, personal information management computer system 130, enterprise portal computer system 140, local user computing device 150, and local user computing device 155).

Referring to FIG. 1B, collaboration assistance computing platform 110 may include one or more processors 111, memory 112, and communication interface 113. A data bus may interconnect processor(s) 111, memory 112, and communication interface 113. Communication interface 113 may be a network interface configured to support communication between collaboration assistance computing platform 110 and one or more networks (e.g., private network 190, public network 195, or the like). Memory 112 may include one or more program modules having instructions that when executed by processor(s) 111 cause collaboration assistance computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of collaboration assistance computing platform 110 and/or by different computing devices that may form and/or otherwise make up collaboration assistance computing platform 110. For example, memory 112 may have, store, and/or include a collaboration assistance module 112a, a collaboration assistance database 112b, a machine learning engine 112c, one or more machine learning datasets 112d, a speech processing module 112e, a speech processing library 112f, a speech generation module 112g, and a speech generation library 112h. Collaboration assistance module 112a and collaboration assistance database 112b may store instructions and/or data that cause and/or enable collaboration assistance computing platform 110 to provide one or more collaboration assistance functions and/or perform other functions. Machine learning engine 112c and the one or more machine learning datasets 112d may store instructions and/or data that cause and/or enable collaboration assistance computing platform 110 to provide one or more machine learning functions and/or associated services. Speech processing module 112e and speech processing library 112f may store instructions and/or data that cause and/or enable collaboration assistance computing platform 110 to provide one or more transcript generation functions, speaker and/or topic identification functions, and/or other speech processing functions. Speech generation module 112g and speech generation library 112h may store instructions and/or data that cause and/or enable collaboration assistance computing platform 110 to provide one or more computerized speech output and/or other speech generation functions.

Figure 2A:
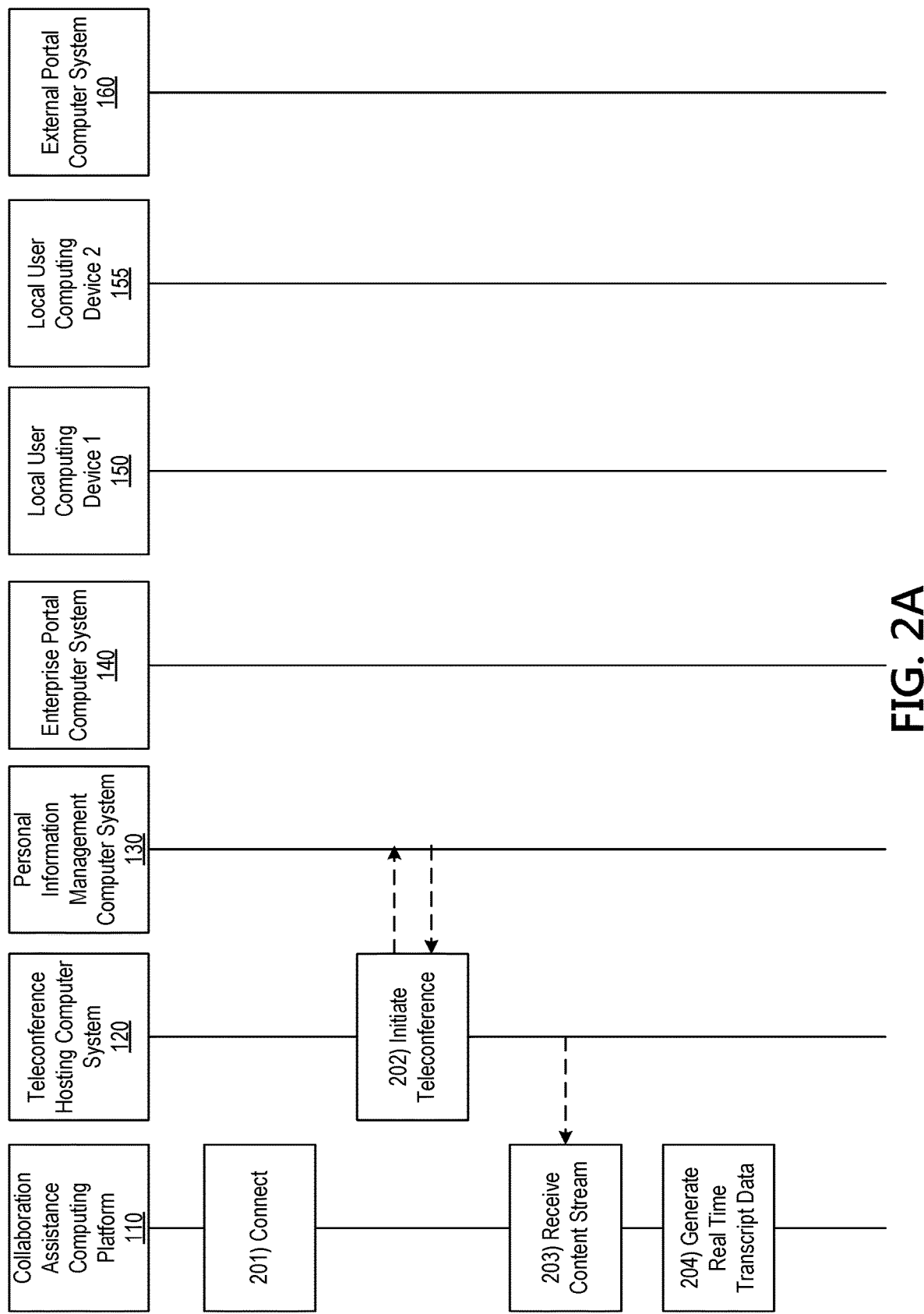

FIGS. 2A-2D depict an illustrative event sequence for implementing and using a data processing system with a machine learning engine to provide automated collaboration assistance functions in accordance with one or more example embodiments. Referring to FIG. 2A, at step 201, collaboration assistance computing platform 110 may connect to teleconference hosting computer system 120 and/or one or more other systems and devices, such as personal information management computer system 130, enterprise portal computer system 140, and/or external portal computer system 160. In some instances, in connecting to teleconference hosting computer system 120, collaboration assistance computing platform 110 may direct, control, and/or otherwise command teleconference hosting computer system 120 to initiate one or more teleconferences, such as a particular teleconference involving one or more particular teams and/or people.

At step 202, teleconference hosting computer system 120 may initiate a teleconference. For example, in initiating a teleconference, teleconference hosting computer system 120 may connect to personal information management computer system 130 to send one or more calendar invitations and/or other messages to one or more individuals to invite and/or connect them to the teleconference. Additionally or alternatively, in initiating a teleconference, teleconference hosting computer system 120 may initiate a telephone call, telepresence session, text chat session, video chat session, and/or the like that may, for instance, be joined by one or more participants in the teleconference and may be monitored by collaboration assistance computing platform 110, as illustrated in greater detail below.

At step 203, collaboration assistance computing platform 110 may receive a content stream associated with the teleconference from teleconference hosting computer system 120. For example, at step 203, collaboration assistance computing platform 110 may receive, via the communication interface (e.g., communication interface 113), from a teleconference hosting computer system (e.g., teleconference hosting computer system 120), a first content stream associated with a first teleconference. The content stream may include audio data, video data, chat data, and/or other data of the teleconference, and collaboration assistance computing platform 110 may receive the content stream from teleconference hosting computer system 120 in-real time (e.g., as the teleconference is occurring and contemporaneously with the audio data, video data, chat data, and/or other data being received and/or generated by teleconference hosting computer system 120). In other words, collaboration assistance computing platform 110 may continuously receive live streaming audio, video, chat text, and/or other data associated with the teleconference from teleconference hosting computer system 120 while the teleconference is occurring.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference. For example, in receiving the first content stream associated with the first teleconference from the teleconference hosting computer system (e.g., teleconference hosting computer system 120), collaboration assistance computing platform 110 may receive, from the teleconference hosting computer system (e.g., teleconference hosting computer system 120), audio data associated with the first teleconference, video data associated with the first teleconference, and chat data associated with the first teleconference. The audio data may correspond to a telephone call associated with the teleconference and/or an audio portion of a telepresence session or video chat session associated with the teleconference. The video data may correspond to a video portion of a telepresence session or video chat session associated with the teleconference. The chat data may correspond to a text chat session or text portion of a telepresence session associated with the teleconference.

At step 204, collaboration assistance computing platform 110 may generate real-time transcript data (which may, e.g., include a live text transcript of the teleconference) based on the content stream and based on machine learning training data (which may, e.g., include information defining specific vocabulary, speech patterns, and/or the like). For example, at step 204, responsive to receiving the first content stream associated with the first teleconference from the teleconference hosting computer system (e.g., teleconference hosting computer system 120), collaboration assistance computing platform 110 may generate, based on a machine learning dataset, first real-time transcript data comprising a real-time textual transcript of the first teleconference. In generating the real-time transcript data, collaboration assistance computing platform 110 may, for instance, identify one or more speakers participating in the teleconference in real-time, process audio data and/or other data associated with the teleconference to determine transcript text corresponding to words spoken by the one or more speakers participating in the teleconference, and write the determined transcript text to a file and/or database along with one or more time stamps and/or other meta data. In some instances, collaboration assistance computing platform 110 may store a streaming copy of the transcript data in one or more files and/or in a database for access by collaboration assistance computing platform 110 and/or one or more other systems and/or devices.

In some embodiments, the machine learning dataset may include organization-specific vocabulary information, team-specific vocabulary information, and individual-specific speech pattern information. For example, the machine learning dataset (which may, e.g., be used by collaboration assistance computing platform 110 in generating the real-time transcript data) may include organization-specific vocabulary information, team-specific vocabulary information, and individual-specific speech pattern information. For instance, the machine learning dataset may include different words that are specific to the organization operating collaboration assistance computing platform 110 and/or conducting the teleconference, as well as different words that are specific to the team(s) participating in the teleconference. In addition, the machine learning dataset may include information defining different speech patterns that are specific to different team members (which may, e.g., improve the ability of collaboration assistance computing platform 110 to identify speakers on the teleconference and understand the words being spoken by different speakers).

In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data. For example, in generating the first real-time transcript data, collaboration assistance computing platform 110 may process the audio data associated with the first teleconference to identify one or more speakers participating in the first teleconference. Subsequently, collaboration assistance computing platform 110 may write transcript text identifying the one or more speakers participating in the first teleconference and words being spoken by the one or more speakers participating in the first teleconference based on the organization-specific vocabulary information, the team-specific vocabulary information, and the individual-specific speech pattern information. Then, collaboration assistance computing platform 110 may insert timestamp data, speaker metadata, and topic metadata into the first real-time transcript data. This may, in some instances, enable collaboration assistance computing platform 110 to generate a summary of the teleconference and/or provide other collaboration assistance functions, as illustrated in greater detail below.

Referring to FIG. 2B, at step 205, collaboration assistance computing platform 110 may detect a live selection. For example, at step 205, collaboration assistance computing platform 110 may detect, during the first teleconference, a live selection of a tracking service provided by the computing platform (e.g., collaboration assistance computing platform 110). In detecting the live selection, collaboration assistance computing platform 110 may determine based on audio data associated with the teleconference and/or the transcript data that collaboration assistance computing platform 110 and/or a tracking service provided by collaboration assistance computing platform 110 has been called on by name and given one or more commands. For example, collaboration assistance computing platform 110 may detect audio data and/or transcript data corresponding to a tracking service being called on by name (e.g., "Hello Project Assistant") and given one or more commands (e.g., "Assign Action Item X to Person Y").

At step 206, collaboration assistance computing platform 110 may perform one or more live selection actions. For example, at step 206, based on detecting the live selection of the tracking service provided by the computing platform (e.g., collaboration assistance computing platform 110), collaboration assistance computing platform 110 may perform one or more live selection actions. In performing one or more live selection actions, collaboration assistance computing platform 110 may, for instance, set and/or store data maintained by collaboration assistance computing platform 110 and/or one or more other systems and/or devices, and/or may control and/or otherwise direct the actions and/or functions of one or more other systems and/or devices. For instance, in an example where collaboration assistance computing platform 110 detects that a tracking service provided by collaboration assistance computing platform 110 has been called on to assign a particular action item to a particular person, collaboration assistance computing platform 110 may set and/or store, in an action item tracking database, data indicating that the action item has been assigned to the particular person, data indicating the current status of the item, and/or other information. In some instances, collaboration assistance computing platform 110 may detect that an action item or other task is being assigned to a particular person without being explicitly called on. In these instances, collaboration assistance computing platform 110 may still similarly generate, store, and/or otherwise track information associated with the action item, even if the tracking service provided by collaboration assistance computing platform 110 is not explicitly called on.

At step 207, collaboration assistance computing platform 110 may detect a live status request. For example, at step 207, collaboration assistance computing platform 110 may detect, during the first teleconference, a request for a live status report from a tracking service provided by the computing platform (e.g., collaboration assistance computing platform 110). In detecting the request for the live status report, collaboration assistance computing platform 110 may, for example, detect audio data and/or transcript data corresponding to a tracking service being called on by name (e.g., "Hello Project Assistant") and asked to provide a report on one or more action items being tracked (e.g., "Please provide a status report on Action Items for Team X").

At step 208, collaboration assistance computing platform 110 may provide a live status report. For example, at step 208, based on detecting the request for the live status report from the tracking service provided by the computing platform (e.g., collaboration assistance computing platform 110), collaboration assistance computing platform 110 may provide live status report information associated with one or more items being tracked by the tracking service provided by the computing platform (e.g., collaboration assistance computing platform 110). In providing the live status report information associated with the one or more items being tracked, collaboration assistance computing platform 110 may, for instance, request and/or receive data associated with the one or more items being tracked from one or more other systems, devices, and/or databases. Subsequently, collaboration assistance computing platform 110 may generate, based on the data associated with the one or more items being tracked, an audio stream and/or other content stream indicating the current status of the one or more items being tracked, and may output the audio stream and/or other content stream (e.g., by sending the audio stream and/or other content stream to teleconference hosting computer system 120 for live output on the teleconference being provided by teleconference hosting computer system 120). For example, collaboration assistance computing platform 110 may generate and send the audio stream to teleconference hosting computer system 120 for live audio output on the teleconference being provided by teleconference hosting computer system 120. In some instances, in addition to or instead of generating and sending a status report for audio output on the teleconference being provided by teleconference hosting computer system 120, collaboration assistance computing platform 110 may generate and send, to teleconference hosting computer system 120, a status report for text output, video output, and/or other forms of output on the teleconference.

Figure 2C:
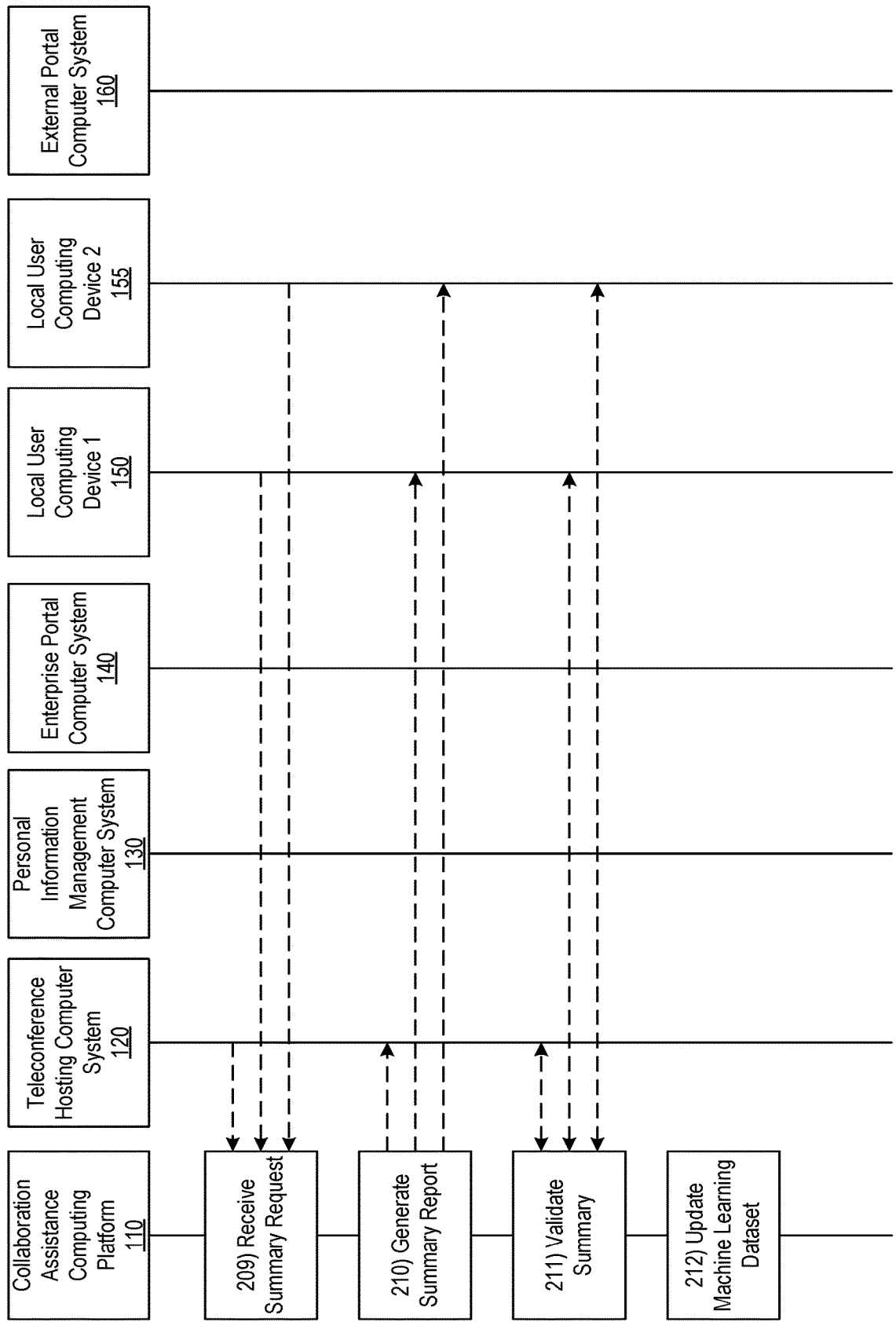

Referring to FIG. 2C, at step 209, collaboration assistance computing platform 110 may receive a request for a summary of the teleconference (e.g., during the teleconference, after the teleconference, based on termination of the teleconference, and/or in other circumstances). For example, at step 209, collaboration assistance computing platform 110 may receive a request for a summary of the first teleconference.

In some embodiments, receiving the request for the summary of the first teleconference may include receiving the request for the summary of the first teleconference from a participant of the first teleconference while the first teleconference is in progress. For example, in receiving the request for the summary of the first teleconference, collaboration assistance computing platform 110 may receive the request for the summary of the first teleconference from a participant of the first teleconference while the first teleconference is in progress. For instance, in receiving the request for the summary of the first teleconference from a participant of the first teleconference while the first teleconference is in progress, collaboration assistance computing platform 110 may detect audio data and/or transcript data corresponding to a tracking service being called on by name (e.g., "Hello Project Assistant") and asked to provide a summary of the teleconference being provided by teleconference hosting computer system 120 (e.g., "Please provide a summary of the call").

In some embodiments, receiving the request for the summary of the first teleconference may include receiving the request for the summary of the first teleconference after the first teleconference has concluded. For example, in receiving the request for the summary of the first teleconference, collaboration assistance computing platform 110 may receive the request for the summary of the first teleconference after the first teleconference has concluded. For instance, in receiving the request for the summary of the first teleconference after the first teleconference has concluded, collaboration assistance computing platform 110 may receive a request for a teleconference summary from one or more user devices (e.g., local user computing device 150, local user computing device 155, remote user computing device 170, remote user computing device 175, and/or the like).

In some embodiments, receiving the request for the summary of the first teleconference may include receiving the request for the summary of the first teleconference from the teleconference hosting computer system based on the first teleconference being terminated. For example, in receiving the request for the summary of the first teleconference, collaboration assistance computing platform 110 may receive the request for the summary of the first teleconference from the teleconference hosting computer system (e.g., teleconference hosting computer system 120) based on the first teleconference being terminated. For instance, in receiving the request for the summary of the teleconference from teleconference hosting computer system 120 based on the teleconference being terminated, collaboration assistance computing platform 110 may receive a notification from teleconference hosting computer system 120 indicating that the teleconference has been concluded and/or otherwise terminated, and receiving this notification may trigger collaboration assistance computing platform 110 to automatically generate and/or send a summary of the teleconference to one or more other systems and/or devices, such as local user computing device 150 and/or local user computing device 155, as illustrated in greater detail below.

At step 210, collaboration assistance computing platform 110 may generate a summary report of the teleconference (e.g., based on the request received at step 209). For example, at step 210, responsive to receiving the request for the summary of the first teleconference, collaboration assistance computing platform 110 may generate, based on the first real-time transcript data comprising the real-time textual transcript of the first teleconference, a summary report of the first teleconference. In some instances, collaboration assistance computing platform 110 may, generate the summary report based on summary preferences defining a target and/or preferred summary length, one or more prioritized topics, one or more prioritized speakers, and/or the like. In addition, collaboration assistance computing platform 110 may provide the summary report on the teleconference (e.g., by generating, sending, and/or otherwise outputting a text stream and/or audio stream to teleconference hosting computer system 120 for live playback on the teleconference) and/or may provide the summary report via one or more other channels, such as via email (e.g., by generating, sending, and/or otherwise outputting text, audio, and/or video summarizing the teleconference to local user computing device 150, local user computing device 155, and/or one or more other email recipients and/or devices. In generating the summary report, collaboration assistance computing platform 110 may identify topics discussed during the teleconference (e.g., based on audio data received from teleconference hosting computer system 120 and/or transcript data generated by collaboration assistance computing platform 110) and may organize information discussed during the teleconference by topic and/or by speaker. In some instances, in generating the summary report, collaboration assistance computing platform 110 may select, for inclusion in the summary report, the most commonly discussed topics on the teleconference, the most active speakers during the teleconference, and/or the like.

In addition, at step 210, after generating the summary report of the teleconference, collaboration assistance computing platform 110 may send the summary report to one or more recipient devices. For example, at step 210, based on generating the summary report of the first teleconference, collaboration assistance computing platform 110 may send, via the communication interface (e.g., communication interface 113), the summary report of the first teleconference to one or more recipient devices (e.g., teleconference hosting computer system 120, enterprise portal computer system 140, local user computing device 150, local user computing device 155, and/or the like).

Figure 5:
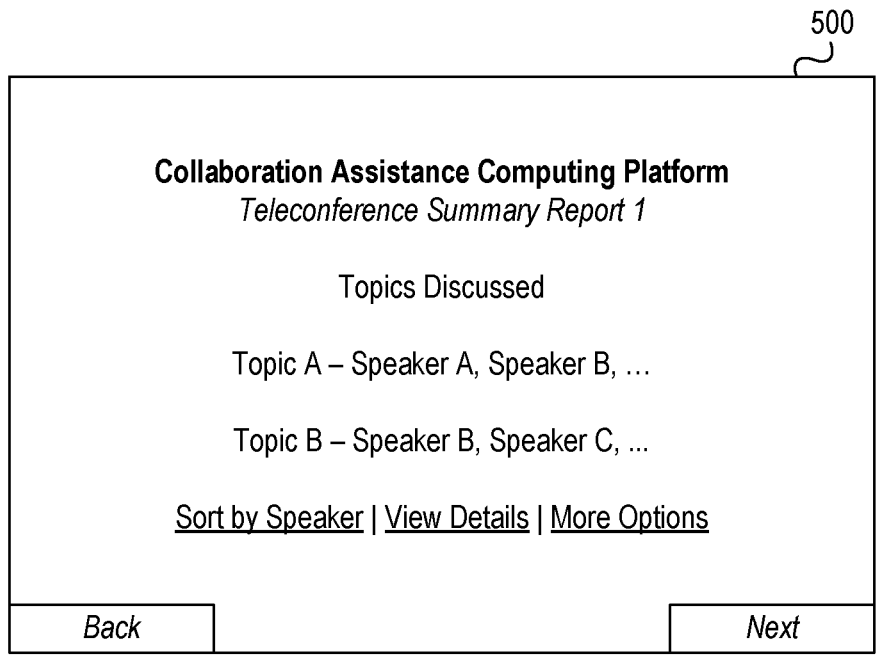

In some instances, in generating and/or outputting the summary report of the teleconference, collaboration assistance computing platform 110 may cause one or more other devices (e.g., local user computing device 150, local user computing device 155) to display and/or otherwise present a graphical user interface similar to graphical user interface 500, which is illustrated in FIG. 5. As seen in FIG. 5, graphical user interface 500 may include one or more fields, controls, and/or other elements having information identifying topics discussed during the teleconference, information identifying particular speakers who discussed particular topics, and/or other information. In addition, graphical user interface 500 may include one or more controls that allow a user to modify the view and/or perform other functions (e.g., "Sort by Speaker," "View Details," "More Options").

In some embodiments, generating the summary report of the first teleconference may include generating the summary report of the first teleconference based on one or more summary preferences specifying a target length for the summary report of the first teleconference, one or more prioritized topics for the summary report of the first teleconference, and one or more prioritized speakers for the summary report of the first teleconference. For example, in generating the summary report of the first teleconference, collaboration assistance computing platform 110 may generate the summary report of the first teleconference based on one or more summary preferences specifying a target length for the summary report of the first teleconference, one or more prioritized topics for the summary report of the first teleconference, and one or more prioritized speakers for the summary report of the first teleconference.

In some embodiments, sending the summary report of the first teleconference to one or more recipient devices may include sending the summary report of the first teleconference to the teleconference hosting computer system. For example, in sending the summary report of the first teleconference to one or more recipient devices, collaboration assistance computing platform 110 may send the summary report of the first teleconference to the teleconference hosting computer system (e.g., teleconference hosting computer system 120). For instance, collaboration assistance computing platform 110 may send the summary report of the teleconference to teleconference hosting computer system 120 for live audio output to the in-progress teleconference or during a follow-up teleconference (e.g., involving the same team and/or similar participants as the original teleconference from which the summary was generated).

In some embodiments, sending the summary report of the first teleconference to one or more recipient devices may include sending the summary report of the first teleconference to one or more email recipient user devices. For example, in sending the summary report of the first teleconference to one or more recipient devices, collaboration assistance computing platform 110 may send the summary report of the first teleconference to one or more email recipient user devices (e.g., local user computing device 150, local user computing device 155, remote user computing device 170, remote user computing device 175). For instance, collaboration assistance computing platform 110 may send the summary report of the first teleconference to one or more email recipient user devices to provide text-based output of the summary of the teleconference via email.

Figure 6:
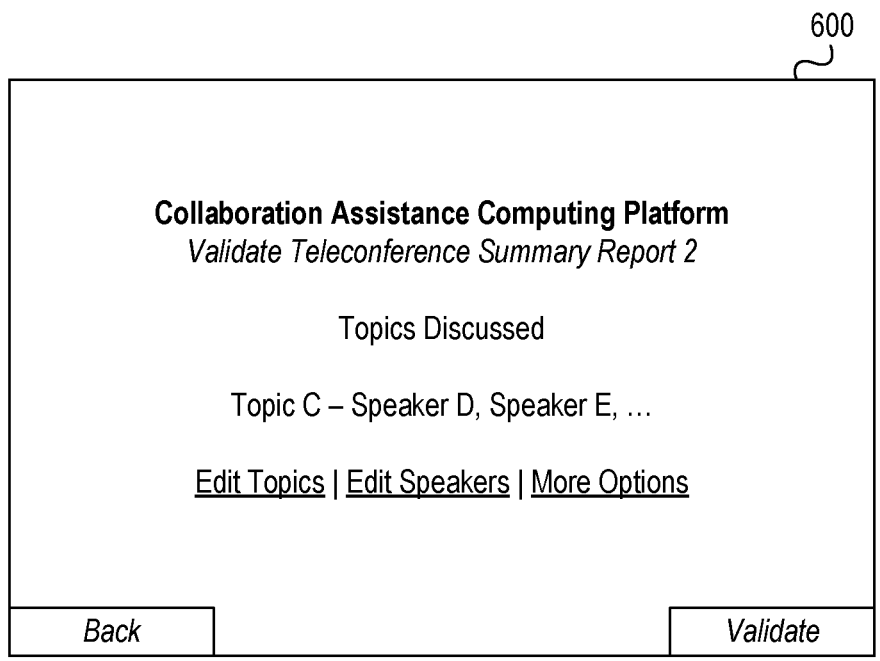

At step 211, collaboration assistance computing platform 110 may validate the summary of the teleconference. For example, at step 211, after generating the summary report of the first teleconference, collaboration assistance computing platform 110 may validate the summary report of the first teleconference generated by the computing platform (e.g., collaboration assistance computing platform 110). In validating the summary report of the teleconference, collaboration assistance computing platform 110 may, for instance, prompt one or more users, such as a team supervisor or manager participating in the teleconference, to approve and/or edit the summary generated by collaboration assistance computing platform 110, the one or more actions items captured by collaboration assistance computing platform 110, and/or other information collected and/or generated by collaboration assistance computing platform 110 based on the teleconference. In some instances, in validating the summary report of the teleconference, collaboration assistance computing platform 110 may cause one or more other devices (e.g., local user computing device 150, local user computing device 155) to display and/or otherwise present a graphical user interface similar to graphical user interface 600, which is illustrated in FIG. 6. As seen in FIG. 6, graphical user interface 600 may include one or more fields, controls, and/or other elements having information identifying topics discussed during the teleconference, information identifying particular speakers who discussed particular topics, and/or other information. In addition, graphical user interface 600 may include one or more controls that allow a user to edit the topics included in the summary, edit the speakers included in the summary, edit other aspects of the summary, and/or perform other functions (e.g., "Edit Topics," "Edit Speakers," "More Options").

At step 212, collaboration assistance computing platform 110 may update the machine learning data set (e.g., based on validating the summary, to facilitate machine learning and/or other iterative improvement of the performance and capabilities of collaboration assistance computing platform 110). For example, at step 212, collaboration assistance computing platform 110 may update the machine learning dataset based on validating the summary report of the first teleconference generated by the computing platform (e.g., collaboration assistance computing platform 110).

Referring to FIG. 2D, at step 213, collaboration assistance computing platform 110 may generate one or more reminders (e.g., based on one or more action items captured by collaboration assistance computing platform 110 during the teleconference and/or being tracked by a tracking service provided by collaboration assistance computing platform 110). For example, at step 213, collaboration assistance computing platform 110 may generate one or more reminders associated with one or more items being tracked by a tracking service provided by the computing platform (e.g., collaboration assistance computing platform 110). Collaboration assistance computing platform 110 may, for instance, generate such reminders based on action item description information, action item due date information, action item assignment information, and/or other information stored and/or maintained by collaboration assistance computing platform 110 and/or by a tracking service provided by collaboration assistance computing platform 110. At step 214, collaboration assistance computing platform 110 may send the one or more reminders. For example, at step 214, collaboration assistance computing platform 110 may send, via the communication interface (e.g., communication interface 113), the one or more reminders associated with the one or more items being tracked by the tracking service provided by the computing platform (e.g., collaboration assistance computing platform 110) to at least one recipient device (e.g., personal information management computer system 130, local user computing device 150, local user computing device 155, and/or the like).

At step 215, collaboration assistance computing platform 110 may track item completion status. In tracking item completion status, collaboration assistance computing platform 110 may, for example, request and/or receive data from one or more other systems and/or devices, and/or may request and/or receive input from one or more users. For example, at step 215, collaboration assistance computing platform 110 may identify a completion status of at least one item being tracked by the tracking service provided by the computing platform (e.g., collaboration assistance computing platform 110) based on item status information received by the computing platform (e.g., collaboration assistance computing platform 110) from one or more user devices (e.g., local user computing device 150, local user computing device 155, remote user computing device 170, remote user computing device 175). The item status information received by the computing platform (e.g., collaboration assistance computing platform 110) from one or more user devices (e.g., local user computing device 150, local user computing device 155, remote user computing device 170, remote user computing device 175) may, for instance, be provided in response to one or more status request prompts generated and/or sent to the one or more user devices by collaboration assistance computing platform 110 and may include information identifying whether particular tasks have been completed, whether particular tasks will require extensions and/or additional time to complete, and/or other status information associated with the action items being tracked by collaboration assistance computing platform 110.

At step 216, collaboration assistance computing platform 110 may provide one or more status reports to one or more other systems and/or devices. For example, at step 216, responsive to identifying the completion status of the at least one item being tracked by the tracking service provided by the computing platform (e.g., collaboration assistance computing platform 110), collaboration assistance computing platform 110 may provide a status report to at least one user device (e.g., local user computing device 150, local user computing device 155, remote user computing device 170, remote user computing device 175). Additionally or alternatively, collaboration assistance computing platform 110 may similarly provide a status report to teleconference hosting computer system 120, enterprise portal computer system 140, external portal computer system 160, and/or one or more other systems and/or devices. In some instances, in providing a status report, collaboration assistance computing platform 110 may generate and/or send text content, audio content, video content, and/or other content indicating the current status of one or more items being tracked by collaboration assistance computing platform 110 (e.g., based on the item completion status identified by collaboration assistance computing platform 110 at step 215).

Figure 3C:
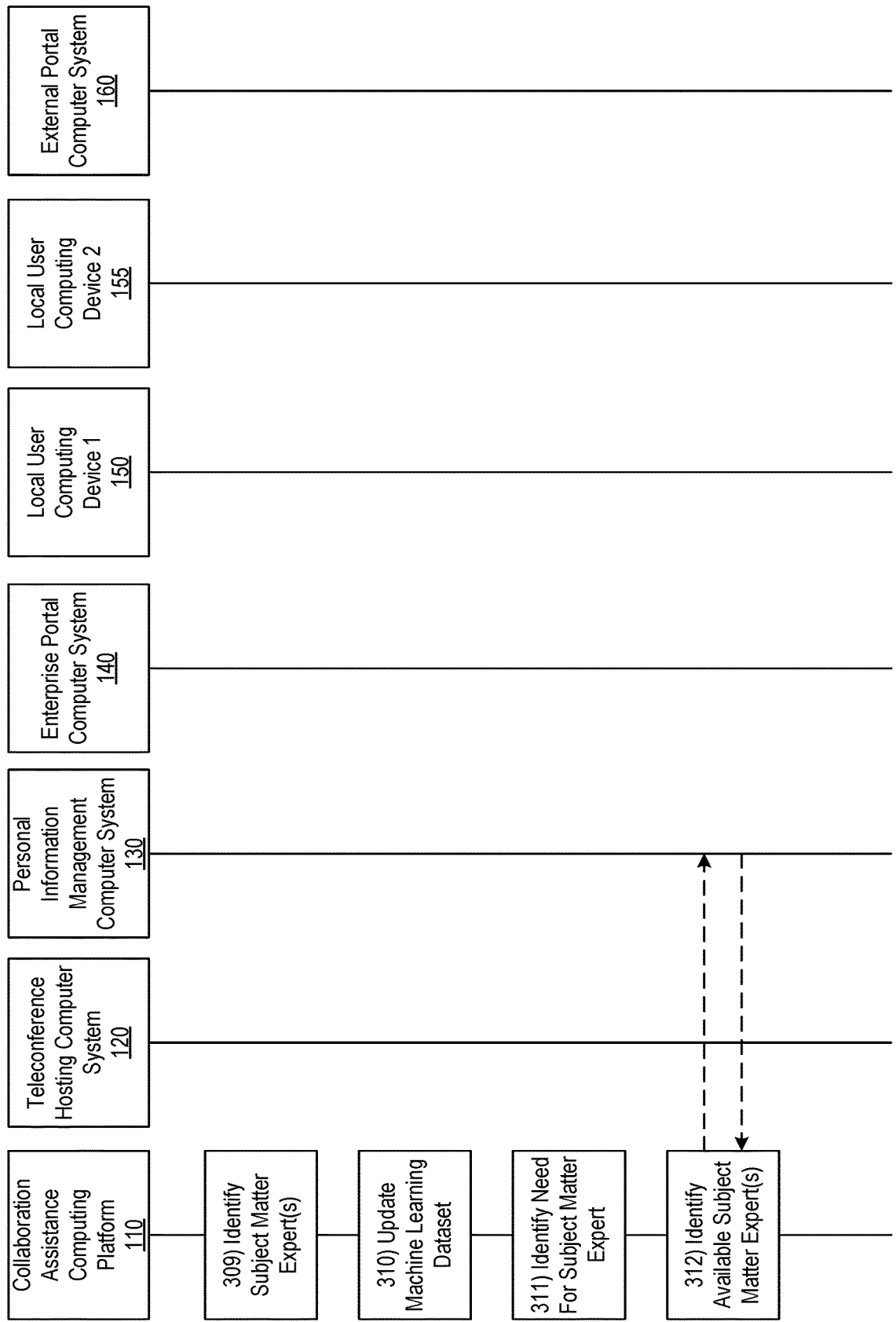

FIGS. 3A-3E depict another illustrative event sequence for implementing and using a data processing system with a machine learning engine to provide automated collaboration assistance functions in accordance with one or more example embodiments. Referring to FIG. 3A, at step 301, collaboration assistance computing platform 110 may connect to teleconference hosting computer system 120 and/or one or more other systems and devices, such as personal information management computer system 130, enterprise portal computer system 140, and/or external portal computer system 160. In some instances, in connecting to teleconference hosting computer system 120, collaboration assistance computing platform 110 may direct, control, and/or otherwise command teleconference hosting computer system 120 to initiate one or more teleconferences, such as a particular teleconference involving one or more particular teams and/or people. For example, collaboration assistance computing platform 110 may direct, control, and/or otherwise command teleconference hosting computer system 120 to initiate one or more teleconferences, similar to how collaboration assistance computing platform 110 may direct, control, and/or otherwise command teleconference hosting computer system 120 in the examples discussed above.

At step 302, teleconference hosting computer system 120 may initiate a teleconference. For example, in initiating a teleconference, teleconference hosting computer system 120 may connect to personal information management computer system 130 to send one or more calendar invitations and/or other messages to one or more individuals to invite and/or connect them to the teleconference. Additionally or alternatively, in initiating a teleconference, teleconference hosting computer system 120 may initiate a telephone call, telepresence session, text chat session, video chat session, and/or the like that may, for instance, be joined by one or more participants in the teleconference and may be monitored by collaboration assistance computing platform 110, similar to how teleconference hosting computer system 120 may initiate a teleconference in the examples discussed above.

At step 303, collaboration assistance computing platform 110 may receive a content stream associated with the teleconference from teleconference hosting computer system 120. For example, at step 303, collaboration assistance computing platform 110 may receive, via the communication interface (e.g., communication interface 113), from a teleconference hosting computer system (e.g., teleconference hosting computer system 120), a first content stream associated with a first teleconference. The content stream may include audio data, video data, chat data, and/or other data of the teleconference, and collaboration assistance computing platform 110 may receive the content stream from teleconference hosting computer system 120 in-real time (e.g., as the teleconference is occurring and contemporaneously with the audio data, video data, chat data, and/or other data being received and/or generated by teleconference hosting computer system 120). In other words, collaboration assistance computing platform 110 may continuously receive live streaming audio, video, chat text, and/or other data associated with the teleconference from teleconference hosting computer system 120 while the teleconference is occurring.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference. For example, in receiving the first content stream associated with the first teleconference from the teleconference hosting computer system (e.g., teleconference hosting computer system 120), collaboration assistance computing platform 110 may receive, from the teleconference hosting computer system (e.g., teleconference hosting computer system 120), audio data associated with the first teleconference, video data associated with the first teleconference, and chat data associated with the first teleconference. The audio data may correspond to a telephone call associated with the teleconference and/or an audio portion of a telepresence session or video chat session associated with the teleconference. The video data may correspond to a video portion of a telepresence session or video chat session associated with the teleconference. The chat data may correspond to a text chat session or text portion of a telepresence session associated with the teleconference.

At step 304, collaboration assistance computing platform 110 may generate real-time transcript data (which may, e.g., include a live text transcript of the teleconference) based on the content stream and based on machine learning training data (which may, e.g., include information defining specific vocabulary, speech patterns, and/or the like). For example, at step 304, responsive to receiving the first content stream associated with the first teleconference from the teleconference hosting computer system (e.g., teleconference hosting computer system 120), collaboration assistance computing platform 110 may generate, based on a machine learning dataset, first real-time transcript data comprising a real-time textual transcript of the first teleconference. In generating the real-time transcript data, collaboration assistance computing platform 110 may, for instance, identify one or more speakers participating in the teleconference in real-time, process audio data and/or other data associated with the teleconference to determine transcript text corresponding to words spoken by the one or more speakers participating in the teleconference, and write the determined transcript text to a file and/or database along with one or more time stamps and/or other meta data. In some instances, collaboration assistance computing platform 110 may store a streaming copy of the transcript data in one or more files and/or in a database for access by collaboration assistance computing platform 110 and/or one or more other systems and/or devices.

In some embodiments, the machine learning dataset may include organization-specific vocabulary information, team-specific vocabulary information, and individual-specific speech pattern information. For example, the machine learning dataset (which may, e.g., be used by collaboration assistance computing platform 110 in generating the real-time transcript data) may include organization-specific vocabulary information, team-specific vocabulary information, and individual-specific speech pattern information. For instance, the machine learning dataset may include different words that are specific to the organization operating collaboration assistance computing platform 110 and/or conducting the teleconference, as well as different words that are specific to the team(s) participating in the teleconference. In addition, the machine learning dataset may include information defining different speech patterns that are specific to different team members (which may, e.g., improve the ability of collaboration assistance computing platform 110 to identify speakers on the teleconference and understand the words being spoken by different speakers).

In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data. For example, in generating the first real-time transcript data, collaboration assistance computing platform 110 may process the audio data associated with the first teleconference to identify one or more speakers participating in the first teleconference. Subsequently, collaboration assistance computing platform 110 may write transcript text identifying the one or more speakers participating in the first teleconference and words being spoken by the one or more speakers participating in the first teleconference based on the organization-specific vocabulary information, the team-specific vocabulary information, and the individual-specific speech pattern information. Then, collaboration assistance computing platform 110 may insert timestamp data, speaker metadata, and topic metadata into the first real-time transcript data. This may, in some instances, enable collaboration assistance computing platform 110 to identify one or more subject matter experts associated with the teleconference and/or provide other collaboration assistance functions, as illustrated in greater detail below.

Referring to FIG. 3B, at step 305, collaboration assistance computing platform 110 may detect a first speaker discussing a first topic. For example, at step 305, collaboration assistance computing platform 110 may detect, during the first teleconference, a first speaker discussing a first topic. For instance, collaboration assistance computing platform 110 may detect the first speaker discussing the first topic based on audio data received from teleconference hosting computer system 120 and/or transcript data generated by collaboration assistance computing platform 110.

Figure 11:
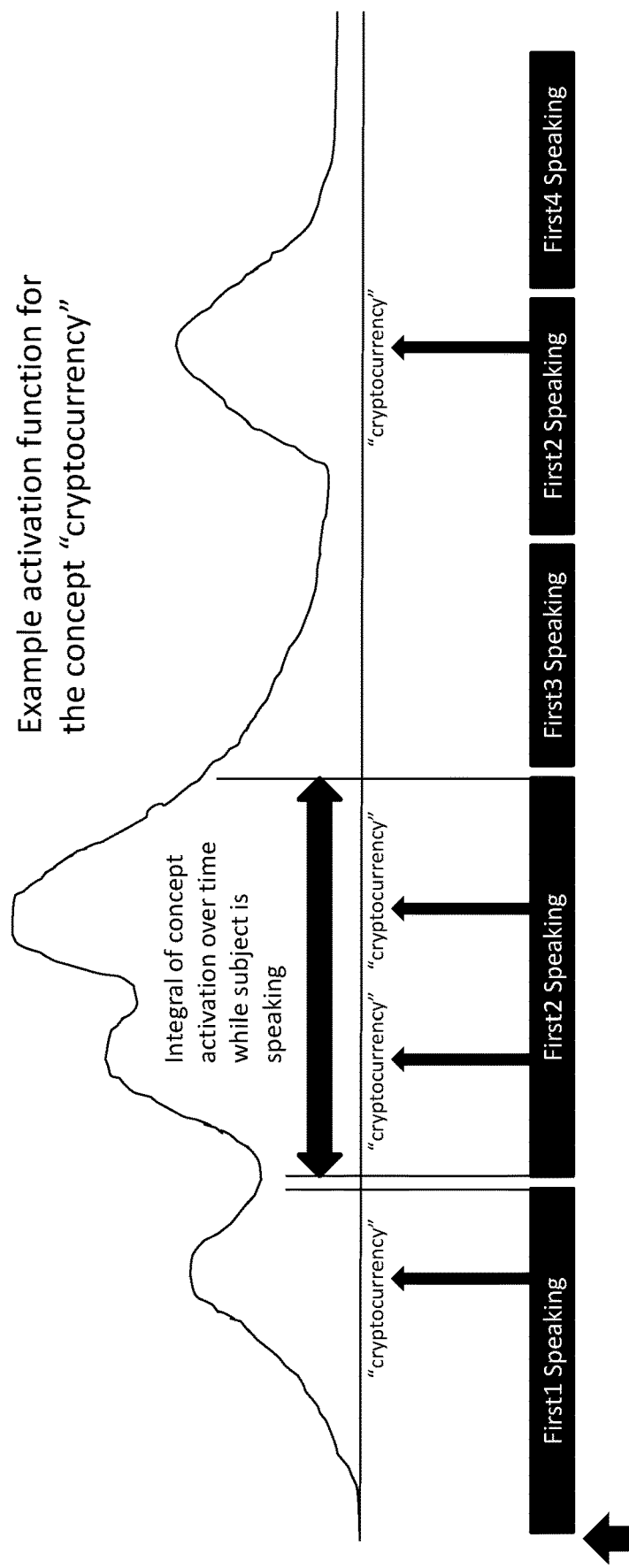
FIG. 11 depicts an example of an activation function that may be utilized in implementing and using a data processing system with a machine learning engine to provide automated collaboration assistance functions in accordance with one or more example embodiments.

At step 306, collaboration assistance computing platform 110 may generate activation function data. For example, at step 306, responsive to detecting the first speaker discussing the first topic, collaboration assistance computing platform 110 may generate first activation function data based on detecting the first speaker discussing the first topic. In generating the first activation function data based on detecting the first speaker discussing the first topic, collaboration assistance computing platform 110 may, for instance, calculate and/or otherwise determine a topic-specific subject matter expert score for the speaker based on the topic they are discussing and/or other words they are using, how long they are speaking for about the topic, and/or the like. An example of how collaboration assistance computing platform 110 may use an activation function to generate activation function data is illustrated in FIG. 11. In particular, in the example illustrated in FIG. 11, collaboration assistance computing platform 110 may detect different speakers discussing the concept of "cryptocurrency" along a time axis representing the elapsed time of the teleconference. As different speakers discuss the concept, collaboration assistance computing platform 110 may calculate and/or otherwise determine an integral of the concept activation over time while a particular person is speaking during the teleconference or other collaboration session. Each mention of a keyword or phrase associated with a particular topic may result in an impulse boost to the activation of the concept. In some instances, the activation may decay exclusively forward in time, while in other instances, the activation may decay both forwards and backwards in time, as in the example illustrated in FIG. 11, so as to associate predecessor speakers with the concept. In some instances, collaboration assistance computing platform 110 may detect usage of synonyms and/or highly-correlated concept keywords and may boost the related concepts activation by a predetermined fractional amount based on detecting such usage. Collaboration assistance computing platform 110 may, for example, execute this activation process for all concepts that are mentioned and/or otherwise discussed during a teleconference or other collaboration session.

Referring again to FIG. 3B, at step 307, collaboration assistance computing platform 110 may detect a second speaker discussing a second topic (e.g., similar to how collaboration assistance computing platform 110 may detect the first speaker discussing the first topic). For example, at step 307, collaboration assistance computing platform 110 may detect, during the first teleconference, a second speaker discussing a second topic. The second speaker may be different from the first speaker, and the second topic may be different from the first topic. In addition, collaboration assistance computing platform 110 may detect the second speaker discussing the second topic based on audio data received from teleconference hosting computer system 120 and/or transcript data generated by collaboration assistance computing platform 110.

At step 308, collaboration assistance computing platform 110 may generate activation function data. For example, at step 308, responsive to detecting the second speaker discussing the second topic, collaboration assistance computing platform 110 may generate second activation function data based on detecting the second speaker discussing the second topic. In generating the second activation function data based on detecting the second speaker discussing the second topic, collaboration assistance computing platform 110 may, for instance, calculate and/or otherwise determine a topic-specific subject matter expert score for the speaker based on the topic they are discussing and/or other words they are using, how long they are speaking for about the topic, and/or the like (e.g., similar to how collaboration assistance computing platform 110 may generate first activation function data based on detecting the first speaker discussing the first topic).

Referring to FIG. 3C, at step 309, collaboration assistance computing platform 110 may identify one or more subject matter experts in one or more topics based on the activation function data. For example, at step 309, collaboration assistance computing platform 110 may identify one or more subject matter experts associated with one or more topics by processing the first real-time transcript data using at least one activation function. In identifying the one or more subject matter experts associated with the one or more topics, collaboration assistance computing platform 110 may, for instance, select and/or otherwise determine that one or more specific speakers are subject matter experts in one or more specific topics based on the one or more specific speakers having a topic-specific subject matter expert score and/or other topic-specific activation level (which may, e.g., be calculated and/or otherwise determined using the activation function described above) exceeding one or more predetermined thresholds. In some instances, different thresholds may be used for identifying subject matter experts in different topics. For example, relatively higher thresholds may be used for identifying experts in relatively more established topics, while relatively lower thresholds may be used for identifying experts in relatively newer and/or less established topics.

At step 310, collaboration assistance computing platform 110 may update the machine learning set. For example, at step 310, collaboration assistance computing platform 110 may update the machine learning dataset based on identifying the one or more subject matter experts associated with the one or more topics. For instance, in updating the machine learning dataset based on identifying the one or more subject matter experts associated with the one or more topics, collaboration assistance computing platform 110 may store and/or otherwise modify information in the machine learning data set to specify that the one or more individuals identified at step 309 may be considered subject matter experts in the specific topics identified at step 309. This may, for instance, enable collaboration assistance computing platform 110 to automatically invite a subject matter expert in a particular topic to a particular teleconference, as illustrated in greater detail below.

At step 311, collaboration assistance computing platform 110 may identify a need for a subject matter expert in a particular topic. For example, at step 311, collaboration assistance computing platform 110 may identify, based on the machine learning data set, a need for a subject matter expert in a first topic. In some instances, collaboration assistance computing platform 110 may identify the need for a subject matter expert in a first topic during the same teleconference discussed in the examples above and initiated at step 302 (e.g., the first teleconference). In some instances, 110 may identify the need for a subject matter expert in a first topic during a different teleconference from the teleconference discussed in the examples above (e.g., a second teleconference different from the first teleconference). In identifying the need for a subject matter expert in a first topic, collaboration assistance computing platform 110 may determine that the subject matter expert is needed based on discovering and/or otherwise determining an intent associated with the teleconference. Collaboration assistance computing platform 110 may, for example, discover and/or otherwise determine an intent associated with a particular teleconference based on past teleconference patterns involving the same and/or similar users, calendar item information, by prompting a user and/or receiving user input in response to such a prompt, and/or by analyzing other information.

In some embodiments, identifying the need for the subject matter expert in the first topic may include identifying the need for the subject matter expert in the first topic during the first teleconference. For example, in identifying the need for the subject matter expert in the first topic, collaboration assistance computing platform 110 may identify the need for the subject matter expert in the first topic during the first teleconference (e.g., during the same teleconference initiated at step 302 and in which the one or more subject matter experts were identified at step 309).

In some embodiments, identifying the need for the subject matter expert in the first topic may include identifying the need for the subject matter expert in the first topic during a second teleconference different from the first teleconference. For example, in identifying the need for the subject matter expert in the first topic, collaboration assistance computing platform 110 may identify the need for the subject matter expert in the first topic during a second teleconference different from the first teleconference (e.g., during a different teleconference than the teleconference initiated at step 302 and in which the one or more subject matter experts were identified at step 309).

In some embodiments, identifying the need for the subject matter expert in the first topic may include identifying the need for the subject matter expert in the first topic based on previous conversation patterns associated with one or more speakers participating in the first teleconference. For example, in identifying the need for the subject matter expert in the first topic, collaboration assistance computing platform 110 may identify the need for the subject matter expert in the first topic based on previous conversation patterns associated with one or more speakers participating in the first teleconference. Collaboration assistance computing platform 110 may analyze the previous conversation patterns associated with the one or more speakers participating in the first teleconference based on a machine learning dataset (e.g., one or more machine learning datasets 112d).

In some embodiments, identifying the need for the subject matter expert in the first topic may include identifying the need for the subject matter expert in the first topic based on calendar information associated with one or more speakers participating in the first teleconference. For example, in identifying the need for the subject matter expert in the first topic, collaboration assistance computing platform 110 may identify the need for the subject matter expert in the first topic based on calendar information associated with one or more speakers participating in the first teleconference. Collaboration assistance computing platform 110 may, for instance, request and/or receive the calendar information associated with the one or more speakers participating in the first teleconference from personal information management computer system 130.

In some embodiments, identifying the need for the subject matter expert in the first topic may include receiving a request for a subject matter expert in the first topic from at least one person participating in the first teleconference. For example, in identifying the need for the subject matter expert in the first topic, collaboration assistance computing platform 110 may receive a request for a subject matter expert in the first topic from at least one person participating in the first teleconference. In some instances, collaboration assistance computing platform 110 may receive a request for a subject matter expert in the first topic from at least one person participating in the first teleconference based on detecting that a tracking service provided by collaboration assistance computing platform 110 has been called on by name and asked to provide a subject matter expert in the first topic. For example, collaboration assistance computing platform 110 may detect audio data and/or transcript data corresponding to a tracking service being called on by name (e.g., "Hello Project Assistant") and asked to provide a subject matter expert in the first topic (e.g., "Please identify and invite a subject matter expert in Topic A").

At step 312, collaboration assistance computing platform 110 may identify one or more available subject matter experts (e.g., based on the need identified at step 311). For example, at step 312, responsive to identifying the need for the subject matter expert in the first topic, collaboration assistance computing platform 110 may identify, based on the machine learning data set, at least one available subject matter expert associated with the first topic. The machine learning data set (which may, e.g., be maintained by collaboration assistance computing platform 110) may, for instance, store information identifying different subject matter experts in different topics (e.g., including the information added to the machine learning dataset by collaboration assistance computing platform 110 at step 310, as discussed above). In some instances, collaboration assistance computing platform 110 may identify subject matter experts in the particular topic that are available to join the teleconference by requesting and/or receiving calendar information for the subject matter experts from personal information management computer system 130. For instance, if an enterprise information technology resource has encountered an outage or other issue that requires triage, collaboration assistance computing platform 110 may identify an available server administrator to join a teleconference to troubleshoot and resolve the issue.

Figure 3D:
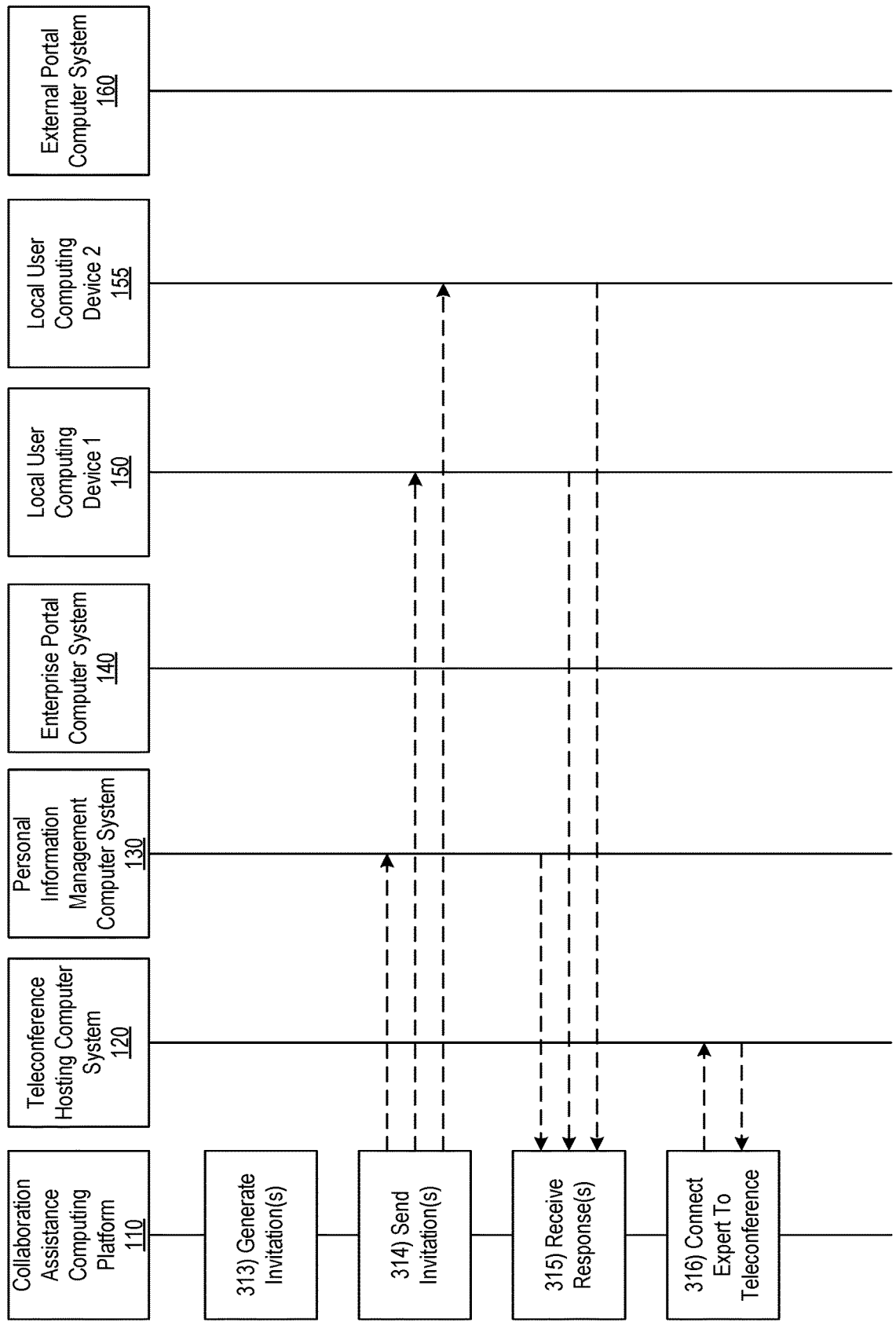

Referring to FIG. 3D, at step 313, collaboration assistance computing platform 110 may generate one or more invitations (e.g., inviting the one or more available subject matter experts identified at step 312 to join the teleconference). For example, at step 313, responsive to identifying the at least one available subject matter expert associated with the first topic, collaboration assistance computing platform 110 may generate at least one subject matter expert invitation for the at least one available subject matter expert associated with the first topic. In some instances, in generating the at least one subject matter expert invitation for the at least one available subject matter expert associated with the first topic, collaboration assistance computing platform 110 may invite the at least one available subject matter expert associated with the first topic in advance of a teleconference involving the first topic. In some instances, in generating the at least one subject matter expert invitation for the at least one available subject matter expert associated with the first topic, collaboration assistance computing platform 110 may invite the at least one available subject matter expert associated with the first topic to join a teleconference involving the first topic that is currently in progress.

At step 314, collaboration assistance computing platform 110 may send the one or more invitations generated at step 313. For example, at step 314, collaboration assistance computing platform 110 may send the at least one subject matter expert invitation to the at least one available subject matter expert associated with the first topic, and the at least one subject matter expert invitation may invite the at least one available subject matter expert associated with the first topic to a teleconference associated with the need for the subject matter expert in the first topic. In some instances, in sending the at least one subject matter expert invitation to the at least one available subject matter expert associated with the first topic, collaboration assistance computing platform 110 may cause one or more other systems and/or devices (e.g., personal information management computer system 130, local user computing device 150, local user computing device 155) to display and/or otherwise present a graphical user interface similar to graphical user interface 700, which is illustrated in FIG. 7. As seen in FIG. 7, graphical user interface 700 may include one or more fields, controls, and/or other elements having information inviting a subject matter expert in a particular topic to join a particular teleconference. In addition, graphical user interface 700 may include one or more controls that allow a user to respond to the invitation (e.g., "Accept," "Decline," "More Options").

At step 315, collaboration assistance computing platform 110 may receive one or more responses to the invitations sent at step 314. For example, at step 315, collaboration assistance computing platform 110 may receive a first response from a first subject matter expert accepting the at least one subject matter expert invitation. At step 316, collaboration assistance computing platform 110 may connect a subject matter expert to the teleconference (e.g., the teleconference for which the need for the subject matter expert was identified at step 311). For example, at step 316, collaboration assistance computing platform 110 may connect the first subject matter expert to the teleconference associated with the need for the subject matter expert in the first topic (e.g., based on receiving the response from the first subject matter expert accepting the at least one subject matter expert invitation).

Figure 3E:
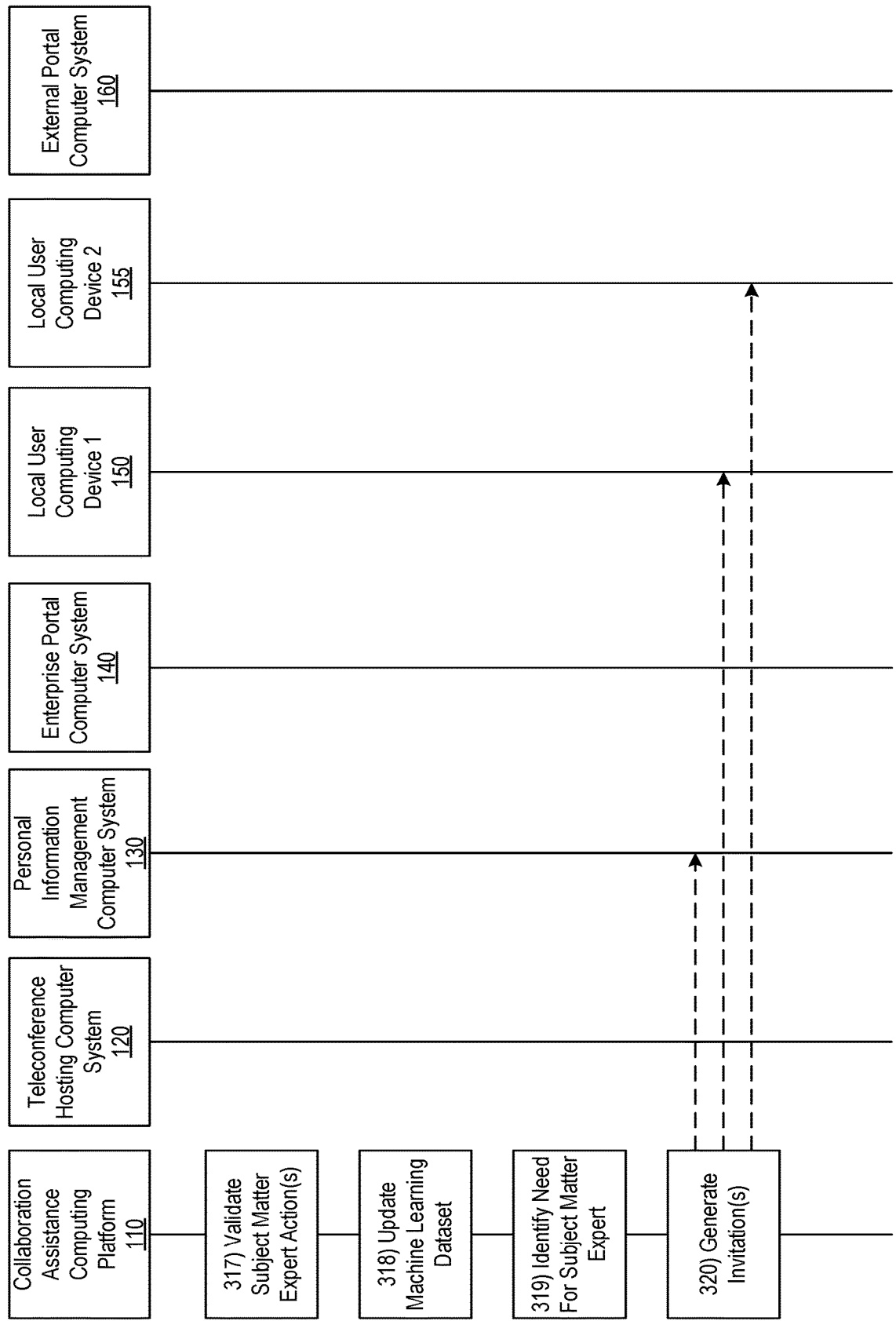

Referring to FIG. 3E, at step 317, collaboration assistance computing platform 110 may validate one or more subject matter expert actions. For example, at step 317, after connecting the first subject matter expert to the teleconference associated with the need for the subject matter expert in the first topic, collaboration assistance computing platform 110 may validate the need for the subject matter expert in the first topic identified by the computing platform (e.g., collaboration assistance computing platform 110). In validating the one or more subject matter expert actions and/or in validating the need for the subject matter expert in the first topic identified by the computing platform, collaboration assistance computing platform 110 may, for instance, confirm and/or otherwise validate that collaboration assistance computing platform 110 accurately and/or correctly identified the need for a subject matter expert in the particular topic, that collaboration assistance computing platform 110 accurately and/or correctly selected and/or invited a person who is a subject matter expert in the particular topic, and/or the like. In some instances, in validating the one or more subject matter expert actions, collaboration assistance computing platform 110 may cause one or more other devices (e.g., local user computing device 150, local user computing device 155) to display and/or otherwise present a graphical user interface similar to graphical user interface 800, which is illustrated in FIG. 8. As seen in FIG. 8, graphical user interface 800 may include one or more fields, controls, and/or other elements having information identifying subject matter expert needs identified for particular topics, information identifying subject matter experts invited, and/or other information. In addition, graphical user interface 800 may include one or more controls that allow a user to edit the subject matter expert needs identified, edit the subject matter experts invited, and/or perform other functions (e.g., "Edit Needs," "Edit Experts," "More Options").

At step 318, collaboration assistance computing platform 110 may update the machine learning dataset (e.g., based on validating the one or more subject matter expert actions, to facilitate machine learning and/or other iterative improvement of the performance and capabilities of collaboration assistance computing platform 110). For example, at step 318, collaboration assistance computing platform 110 may update the machine learning dataset based on validating the need for the subject matter expert in the first topic identified by the computing platform (e.g., collaboration assistance computing platform 110).

At step 319, collaboration assistance computing platform 110 may identify another need for a subject matter expert in a particular topic (e.g., based on the updated machine learning data set), similar to how collaboration assistance computing platform 110 may identify a need for a subject matter expert in a particular topic in the examples discussed above. For example, at step 319, after updating the machine learning dataset based on validating the need for the subject matter expert in the first topic identified by the computing platform (e.g., collaboration assistance computing platform 110), collaboration assistance computing platform 110 may identify, based on the machine learning data set, a need for a subject matter expert in a second topic.

At step 320, collaboration assistance computing platform 110 may generate one or more invitations for one or more subject matter experts based on the need identified at step 319, and collaboration assistance computing platform 110 may send such invitations, similar to how collaboration assistance computing platform 110 may generate and send one or more invitations to one or more subject matter experts in the examples discussed above. For example, at step 320, responsive to identifying the need for the subject matter expert in the second topic, collaboration assistance computing platform 110 may generate, based on the machine learning dataset, at least one subject matter expert invitation for at least one available subject matter expert associated with the second topic. In addition, collaboration assistance computing platform 110 may send the at least one subject matter expert invitation for the at least one available subject matter expert associated with the second topic, receive one or more responses, and connect one or more subject matters to a teleconference based on the one or more responses, similar to how collaboration assistance computing platform 110 may execute such actions in the examples discussed above.

Figure 4C:
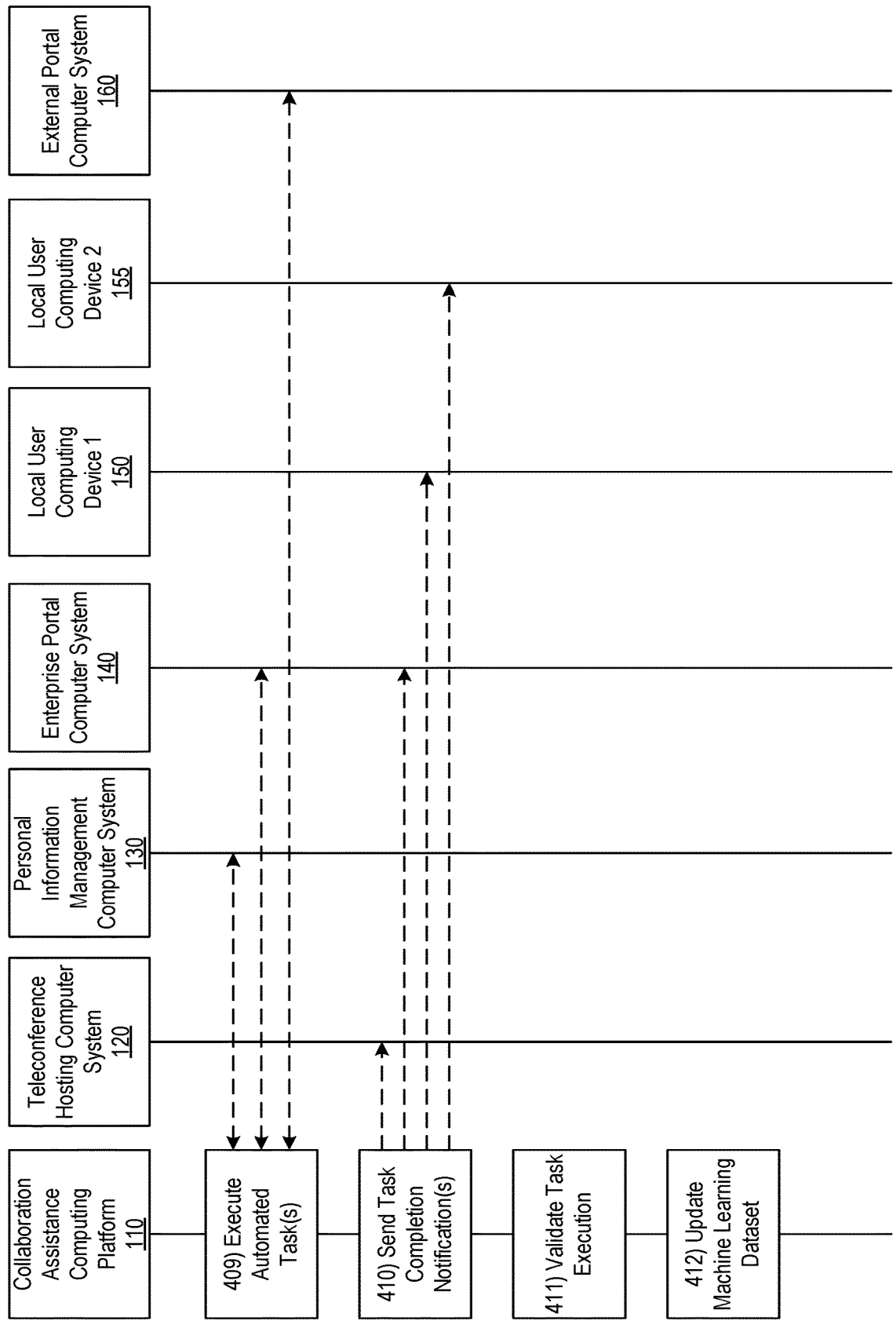

FIGS. 4A-4C depict another illustrative event sequence for implementing and using a data processing system with a machine learning engine to provide automated collaboration assistance functions in accordance with one or more example embodiments. Referring to FIG. 4A, at step 401, collaboration assistance computing platform 110 may connect to teleconference hosting computer system 120 and/or one or more other systems and devices, such as personal information management computer system 130, enterprise portal computer system 140, and/or external portal computer system 160. In some instances, in connecting to teleconference hosting computer system 120, collaboration assistance computing platform 110 may direct, control, and/or otherwise command teleconference hosting computer system 120 to initiate one or more teleconferences, such as a particular teleconference involving one or more particular teams and/or people. For example, collaboration assistance computing platform 110 may direct, control, and/or otherwise command teleconference hosting computer system 120 to initiate one or more teleconferences, similar to how collaboration assistance computing platform 110 may direct, control, and/or otherwise command teleconference hosting computer system 120 in the examples discussed above.

At step 402, teleconference hosting computer system 120 may initiate a teleconference. For example, in initiating a teleconference, teleconference hosting computer system 120 may connect to personal information management computer system 130 to send one or more calendar invitations and/or other messages to one or more individuals to invite and/or connect them to the teleconference. Additionally or alternatively, in initiating a teleconference, teleconference hosting computer system 120 may initiate a telephone call, telepresence session, text chat session, video chat session, and/or the like that may, for instance, be joined by one or more participants in the teleconference and may be monitored by collaboration assistance computing platform 110, similar to how teleconference hosting computer system 120 may initiate a teleconference in the examples discussed above.

At step 403, collaboration assistance computing platform 110 may receive a content stream associated with the teleconference from teleconference hosting computer system 120. For example, at step 403, collaboration assistance computing platform 110 may receive, via the communication interface (e.g., communication interface 113), from a teleconference hosting computer system (e.g., teleconference hosting computer system 120), a first content stream associated with a first teleconference. The content stream may include audio data, video data, chat data, and/or other data of the teleconference, and collaboration assistance computing platform 110 may receive the content stream from teleconference hosting computer system 120 in-real time (e.g., as the teleconference is occurring and contemporaneously with the audio data, video data, chat data, and/or other data being received and/or generated by teleconference hosting computer system 120). In other words, collaboration assistance computing platform 110 may continuously receive live streaming audio, video, chat text, and/or other data associated with the teleconference from teleconference hosting computer system 120 while the teleconference is occurring.

In some embodiments, receiving the first content stream associated with the first teleconference from the teleconference hosting computer system may include receiving, from the teleconference hosting computer system, audio data associated with the first teleconference, video data associated with the first teleconference, and chat data associated with the first teleconference. For example, in receiving the first content stream associated with the first teleconference from the teleconference hosting computer system (e.g., teleconference hosting computer system 120), collaboration assistance computing platform 110 may receive, from the teleconference hosting computer system (e.g., teleconference hosting computer system 120), audio data associated with the first teleconference, video data associated with the first teleconference, and chat data associated with the first teleconference. The audio data may correspond to a telephone call associated with the teleconference and/or an audio portion of a telepresence session or video chat session associated with the teleconference. The video data may correspond to a video portion of a telepresence session or video chat session associated with the teleconference. The chat data may correspond to a text chat session or text portion of a telepresence session associated with the teleconference.

At step 404, collaboration assistance computing platform 110 may generate real-time transcript data (which may, e.g., include a live text transcript of the teleconference) based on the content stream and based on machine learning training data (which may, e.g., include information defining specific vocabulary, speech patterns, and/or the like). For example, at step 404, responsive to receiving the first content stream associated with the first teleconference from the teleconference hosting computer system (e.g., teleconference hosting computer system 120), collaboration assistance computing platform 110 may generate, based on a machine learning dataset, first real-time transcript data comprising a real-time textual transcript of the first teleconference. In generating the real-time transcript data, collaboration assistance computing platform 110 may, for instance, identify one or more speakers participating in the teleconference in real-time, process audio data and/or other data associated with the teleconference to determine transcript text corresponding to words spoken by the one or more speakers participating in the teleconference, and write the determined transcript text to a file and/or database along with one or more time stamps and/or other meta data. In some instances, collaboration assistance computing platform 110 may store a streaming copy of the transcript data in one or more files and/or in a database for access by collaboration assistance computing platform 110 and/or one or more other systems and/or devices.

In some embodiments, the machine learning dataset may include organization-specific vocabulary information, team-specific vocabulary information, and individual-specific speech pattern information. For example, the machine learning dataset (which may, e.g., be used by collaboration assistance computing platform 110 in generating the real-time transcript data) may include organization-specific vocabulary information, team-specific vocabulary information, and individual-specific speech pattern information. For instance, the machine learning dataset may include different words that are specific to the organization operating collaboration assistance computing platform 110 and/or conducting the teleconference, as well as different words that are specific to the team(s) participating in the teleconference. In addition, the machine learning dataset may include information defining different speech patterns that are specific to different team members (which may, e.g., improve the ability of collaboration assistance computing platform 110 to identify speakers on the teleconference and understand the words being spoken by different speakers).

In some embodiments, generating the first real-time transcript data may include: processing the audio data associated with the first teleconference to identify one or more speakers participating in the first teleconference; writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and inserting timestamp data, speaker metadata, and topic metadata into the first real-time transcript data. For example, in generating the first real-time transcript data, collaboration assistance computing platform 110 may process the audio data associated with the first teleconference to identify one or more speakers participating in the first teleconference. Subsequently, collaboration assistance computing platform 110 may write transcript text identifying the one or more speakers participating in the first teleconference and words being spoken by the one or more speakers participating in the first teleconference based on the organization-specific vocabulary information, the team-specific vocabulary information, and the individual-specific speech pattern information. Then, collaboration assistance computing platform 110 may insert timestamp data, speaker metadata, and topic metadata into the first real-time transcript data. This may, in some instances, enable collaboration assistance computing platform 110 to identify and execute automated tasks associated with action items discussed and/or detected during a teleconference and/or provide other collaboration assistance functions, as illustrated in greater detail below.

In some embodiments, the machine learning dataset may include organization-specific task automation training data linking one or more action items to one or more tasks performable by the computing platform. For example, the machine learning dataset (e.g., one or more machine learning datasets 112d) may include organization-specific task automation training data linking one or more action items to one or more tasks performable by the computing platform (e.g., collaboration assistance computing platform 110). For instance, the organization-specific task automation training data may specify that certain action items always or typically include certain tasks that collaboration assistance computing platform 110 is capable of performing automatically, and this data thus may enable collaboration assistance computing platform 110 to identify and execute automated tasks associated with action items discussed and/or detected during a teleconference, as illustrated in greater detail below.

Referring to FIG. 4B, at step 405, collaboration assistance computing platform 110 may detect a first action being discussed in the teleconference (e.g., based on audio data received from teleconference hosting computer system 120 and/or transcript data generated by collaboration assistance computing platform 110). For example, at step 405, collaboration assistance computing platform 110 may detect, during the first teleconference, based on the first real-time transcript data comprising the real-time textual transcript of the first teleconference, a first action item associated with the first teleconference. In some instances, collaboration assistance computing platform 110 may detect such an action item based on the action item being assigned to a person participating in the teleconference. In some instances, collaboration assistance computing platform 110 may detect such an action item by detecting that a tracking service provided by collaboration assistance computing platform 110 has been called on to assign a particular action item to a particular person, and collaboration assistance computing platform 110 may set and/or store, in an action item tracking database, data indicating that the action item has been assigned to the particular person, data indicating the current status of the item, and/or other information. In some instances, collaboration assistance computing platform 110 may detect an action item based on detecting that an action item or other task is being assigned to a particular person without a tracking service provided by collaboration assistance computing platform 110 being explicitly called on. In these instances, collaboration assistance computing platform 110 may still similarly generate, store, and/or otherwise track information associated with the action item, even if the tracking service provided by collaboration assistance computing platform 110 is not explicitly called on. In some instances, collaboration assistance computing platform 110 may detect an action item (e.g., at step 405) corresponding a general or specific need of a particular team participating in the teleconference, such as a team action item or team goal, rather than a specific action item that is assigned to a specific person participating in the teleconference.

In some embodiments, detecting the first action item associated with the first teleconference may include detecting an explicit assignment of at least one automated task to the computing platform. For example, in detecting the first action item associated with the first teleconference, collaboration assistance computing platform 110 may detect an explicit assignment of at least one automated task to the computing platform (e.g., collaboration assistance computing platform 110). For example, collaboration assistance computing platform 110 may receive and/or otherwise detect audio data from teleconference hosting computer system 120 and/or transcript data generated by collaboration assistance computing platform 110 indicating that at least one automated task has been assigned to collaboration assistance computing platform 110 (e.g., "Please reserve the conference room on January 31.").

In some embodiments, detecting the first action item associated with the first teleconference may include detecting an implicit assignment of at least one automated task to a person participating in the first teleconference. For example, in detecting the first action item associated with the first teleconference, collaboration assistance computing platform 110 may detect an implicit assignment of at least one automated task to a person participating in the first teleconference. For example, collaboration assistance computing platform 110 may receive and/or otherwise detect audio data from teleconference hosting computer system 120 and/or transcript data generated by collaboration assistance computing platform 110 indicating that at least one automated task has been assigned to a person participating in the teleconference that can be automatically performed by collaboration assistance computing platform 110 (e.g., "First1, please reserve the conference room on January 31.").

At step 406, collaboration assistance computing platform 110 may update tracking data. For example, collaboration assistance computing platform 110 may generate and/or modify tracking data indicating that the first action item associated with the first teleconference has been detected, needed by a particular team, assigned to a particular individual, and/or the like. At step 407, collaboration assistance computing platform 110 may load a machine learning data set, such as one or more machine learning datasets 112*d*, which may, for instance, include task automation training data.

At step 408, collaboration assistance computing platform 110 may identify one or more automated tasks associated with the detected action item (e.g., based on the machine learning dataset and/or the task automation training data included in the machine learning dataset). For example, at step 408, responsive to detecting the first action item associated with the first teleconference, collaboration assistance computing platform 110 may identify, based on the machine learning dataset, one or more automated tasks associated with the first action item associated with the first teleconference. In some instances, collaboration assistance computing platform 110 may identify the one or more automated tasks using the same machine learning dataset that collaboration assistance computing platform 110 may use to generate the transcript data, while in other instances, collaboration assistance computing platform 110 may identify the one or more automated tasks using a different machine learning dataset than the machine learning dataset that collaboration assistance computing platform 110 may use to generate the transcript data. In identifying the one or more automated tasks associated with the action item, collaboration assistance computing platform 110 may identify and/or otherwise determine one or more needs associated with the action item and then identify one or more available automated responses to the one or more identified needs associated with the action item.

Referring to FIG. 4C, at step 409, collaboration assistance computing platform 110 may execute one or more automated tasks (e.g., the one or more automated tasks identified at step 408). For example, at step 409, responsive to identifying the one or more automated tasks associated with the first action item associated with the first teleconference, collaboration assistance computing platform 110 may execute the one or more automated tasks associated with the first action item associated with the first teleconference. In executing the one or more automated tasks associated with the action item, collaboration assistance computing platform 110 may, for instance, generate a suggested email response, fill out a form, use a back-end application programming interface to control a service provider, scan an internal portal to automate request submission, and/or perform other automated functions as be needed.

In some embodiments, executing the one or more automated tasks associated with the first action item associated with the first teleconference may include generating at least one suggested email response. For example, in executing the one or more automated tasks associated with the first action item associated with the first teleconference, collaboration assistance computing platform 110 may generate at least one suggested email response. In some embodiments, executing the one or more automated tasks associated with the first action item associated with the first teleconference may include filling out at least one form document. For example, in executing the one or more automated tasks associated with the first action item associated with the first teleconference, collaboration assistance computing platform 110 may fill out at least one form document. In some embodiments, executing the one or more automated tasks associated with the first action item associated with the first teleconference may include communicating with at least one external service provider using an application programming interface. For example, in executing the one or more automated tasks associated with the first action item associated with the first teleconference, collaboration assistance computing platform 110 may communicate with at least one external service provider using an application programming interface.

In some embodiments, executing the one or more automated tasks associated with the first action item associated with the first teleconference may include communicating with at least one internal portal to submit one or more internal requests. For example, in executing the one or more automated tasks associated with the first action item associated with the first teleconference, collaboration assistance computing platform 110 may communicate with at least one internal portal to submit one or more internal requests. For instance, collaboration assistance computing platform 110 may communicate with at least one internal portal to submit one or more internal requests to one or more other entities and/or departments within an organization associated with one or more participants in the teleconference.

At step 410, collaboration assistance computing platform 110 may generate and send one or more task completion notifications (e.g., to one or more team leads, team members, other systems and/or devices, and/or the like). For example, at step 410, after executing the one or more automated tasks associated with the first action item associated with the first teleconference, collaboration assistance computing platform 110 may generate at least one task completion notification indicating that the one or more automated tasks associated with the first action item associated with the first teleconference have been executed. Subsequently, collaboration assistance computing platform 110 may send, via the communication interface (e.g., communication interface 113), to at least one recipient device (e.g., teleconference hosting computer system 120, enterprise portal computer system 140, local user computing device 150, local user computing device 155, external portal computer system 160, remote user computing device 170, remote user computing device 175), the at least one task completion notification indicating that the one or more automated tasks associated with the first action item associated with the first teleconference have been executed.

Figure 9:
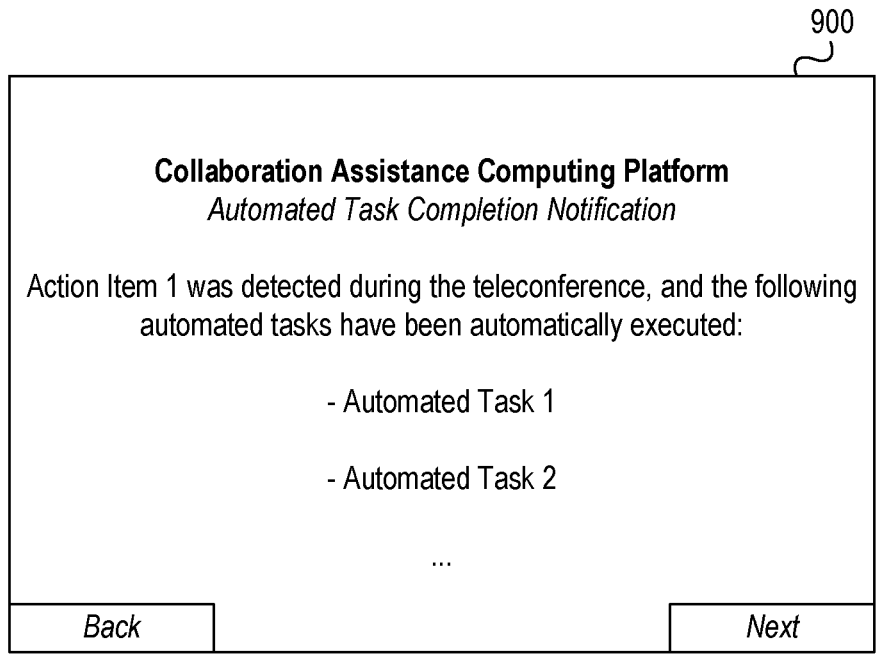

In some instances, in generating and sending one or more task completion notifications, collaboration assistance computing platform 110 may cause one or more other systems and/or devices (e.g., teleconference hosting computer system 120, enterprise portal computer system 140, local user computing device 150, local user computing device 155, external portal computer system 160, remote user computing device 170, remote user computing device 175) to display and/or otherwise present a graphical user interface similar to graphical user interface 900, which is illustrated in FIG. 9. As seen in FIG. 9, graphical user interface 900 may include one or more fields, controls, and/or other elements having information indicating that a particular action item was detected during a teleconference and that one or more automated tasks have been automatically executed.

At step 411, collaboration assistance computing platform 110 may validate execution of the one or more automated tasks. For example, at step 411, after executing the one or more automated tasks associated with the first action item associated with the first teleconference, collaboration assistance computing platform 110 may validate execution of the one or more automated tasks associated with the first action item associated with the first teleconference. In some instances, in validating the execution of the one or more automated tasks associated with the action item, collaboration assistance computing platform 110 may prompt a team leader, team member, or other teleconference participant to confirm and/or otherwise validate the accuracy of, usefulness of, and/or performance of the one or more automated tasks identified and/or executed by collaboration assistance computing platform 110.

Figure 10:
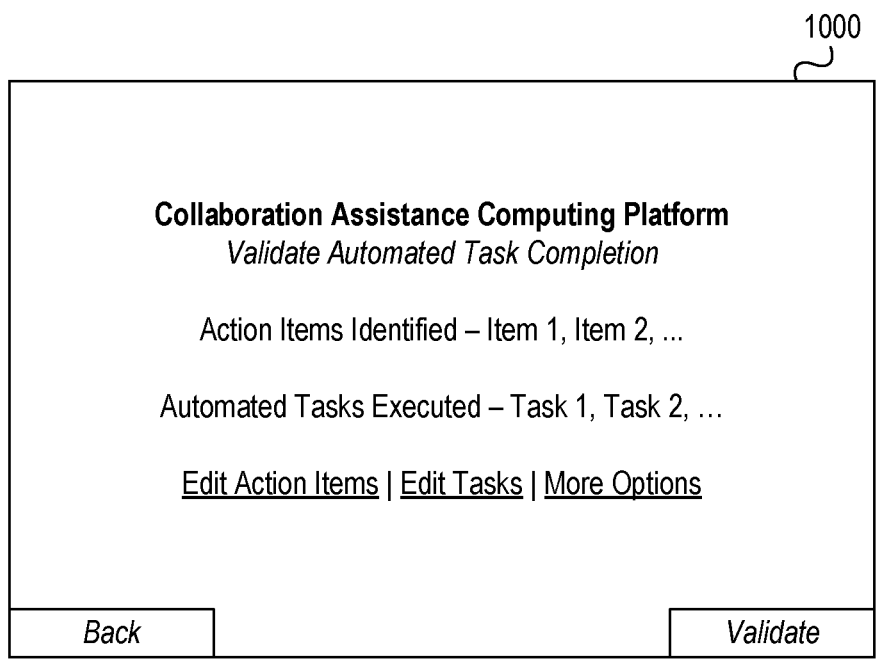

In some instances, in validating the execution of the one or more automated tasks associated with the action item, collaboration assistance computing platform 110 may cause one or more other systems and/or devices (e.g., teleconference hosting computer system 120, enterprise portal computer system 140, local user computing device 150, local user computing device 155, external portal computer system 160, remote user computing device 170, remote user computing device 175) to display and/or otherwise present a graphical user interface similar to graphical user interface 1000, which is illustrated in FIG. 10. As seen in FIG. 10, graphical user interface 1000 may include one or more fields, controls, and/or other elements having information identifying action items detected during a teleconference, information identifying automated tasks executed by collaboration assistance computing platform 110, and/or other information. In addition, graphical user interface 1000 may include one or more controls that allow a user to edit the action items discussed during the teleconference, edit the automated tasks corresponding to the action items discussed during the teleconference, and/or perform other functions (e.g., "Edit Action Items," "Edit Tasks," "More Options").

At step 412, collaboration assistance computing platform 110 may update the machine learning dataset (e.g., based on validating the execution of the one or more automated tasks associated with the action item, to facilitate machine learning and/or other iterative improvement of the performance and capabilities of collaboration assistance computing platform 110). For example, at step 412, collaboration assistance computing platform 110 may update the machine learning dataset based on validating the execution of the one or more automated tasks associated with the first action item associated with the first teleconference. In updating the machine learning dataset based on validating the execution of the one or more automated tasks associated with the action item, collaboration assistance computing platform 110 may, for example, update task automation training data included in the machine learning data set in view of user input received from a team leader, team member, or other teleconference participant (which may, e.g., be received by collaboration assistance computing platform 110 via graphical user interface 1000).

Figure 12:
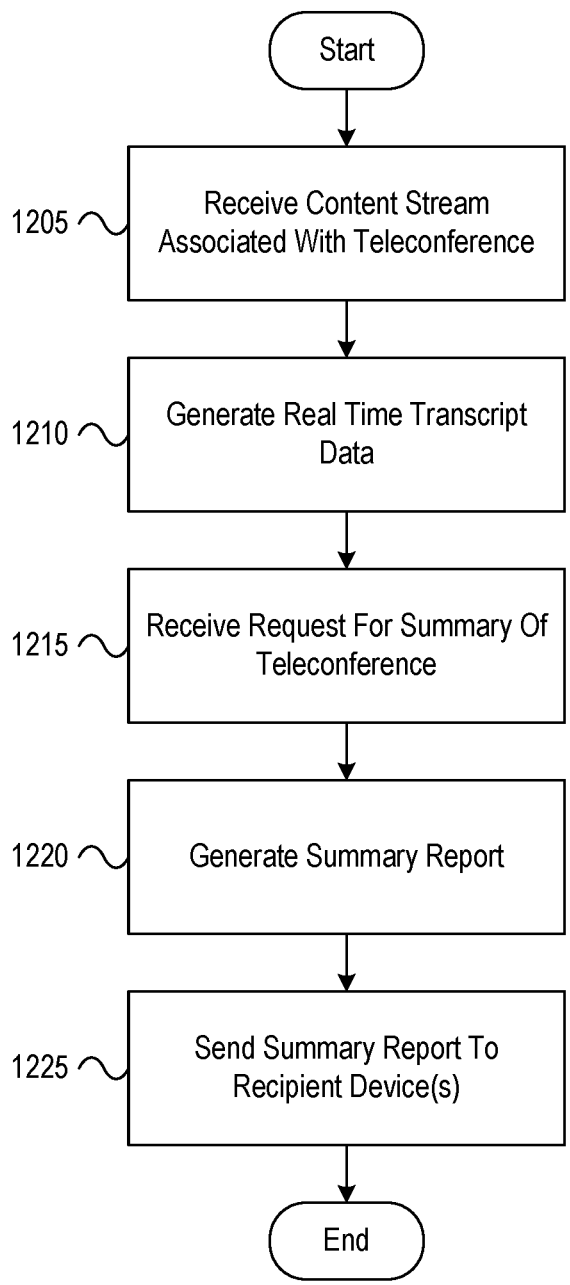
FIG. 12 depicts an illustrative method for implementing and using a data processing system with a machine learning engine to provide automated collaboration assistance functions in accordance with one or more example embodiments.

FIG. 12 depicts an illustrative method for implementing and using a data processing system with a machine learning engine to provide automated collaboration assistance functions in accordance with one or more example embodiments. Referring to FIG. 12, at step 1205, a computing platform having at least one processor, a memory, and a communication interface may receive, via the communication interface, from a teleconference hosting computer system, a first content stream associated with a first teleconference. At step 1210, responsive to receiving the first content stream associated with the first teleconference from the teleconference hosting computer system, the computing platform may generate, based on a machine learning dataset, first real-time transcript data comprising a real-time textual transcript of the first teleconference. At step 1215, the computing platform may receive a request for a summary of the first teleconference. At step 1220, responsive to receiving the request for the summary of the first teleconference, generate, based on the first real-time transcript data comprising the real-time textual transcript of the first teleconference, the computing platform may a summary report of the first teleconference. At step 1225, based on generating the summary report of the first teleconference, the computing platform may send, via the communication interface, the summary report of the first teleconference to one or more recipient devices.

Figure 13:
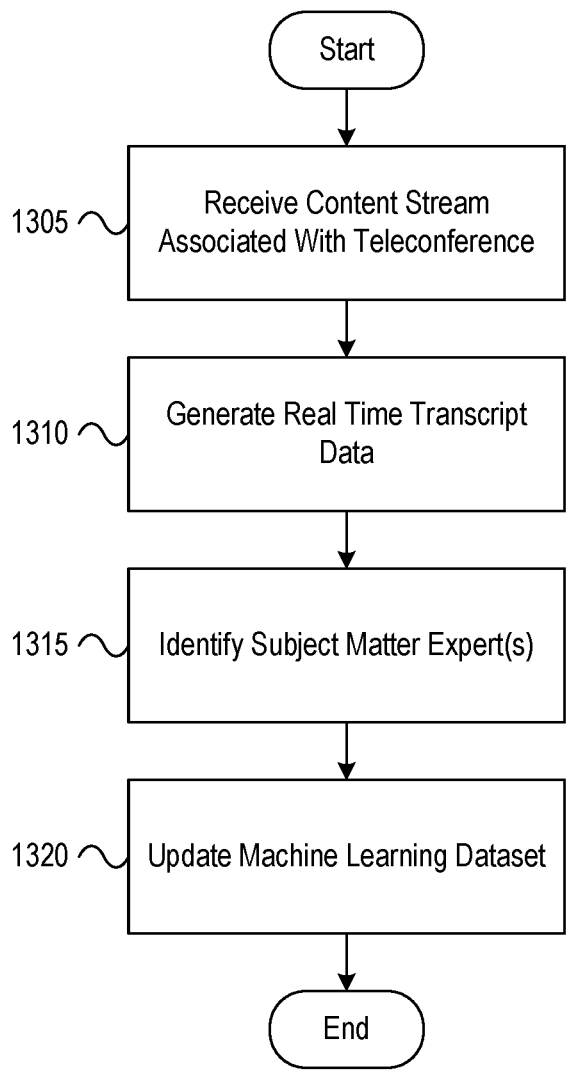
FIG. 13 depicts another illustrative method for implementing and using a data processing system with a machine learning engine to provide automated collaboration assistance functions in accordance with one or more example embodiments.

FIG. 13 depicts another illustrative method for implementing and using a data processing system with a machine learning engine to provide automated collaboration assistance functions in accordance with one or more example embodiments. Referring to FIG. 13, at step 1305, a computing platform having at least one processor, a memory, and a communication interface may receive, via the communication interface, from a teleconference hosting computer system, a first content stream associated with a first teleconference. At step 1310, responsive to receiving the first content stream associated with the first teleconference from the teleconference hosting computer system, the computing platform may generate, based on a machine learning dataset, first real-time transcript data comprising a real-time textual transcript of the first teleconference. At step 1315, the computing platform may identify one or more subject matter experts associated with one or more topics by processing the first real-time transcript data using at least one activation function. At step 1320, the computing platform may update the machine learning dataset based on identifying the one or more subject matter experts associated with the one or more topics.

Figure 14:
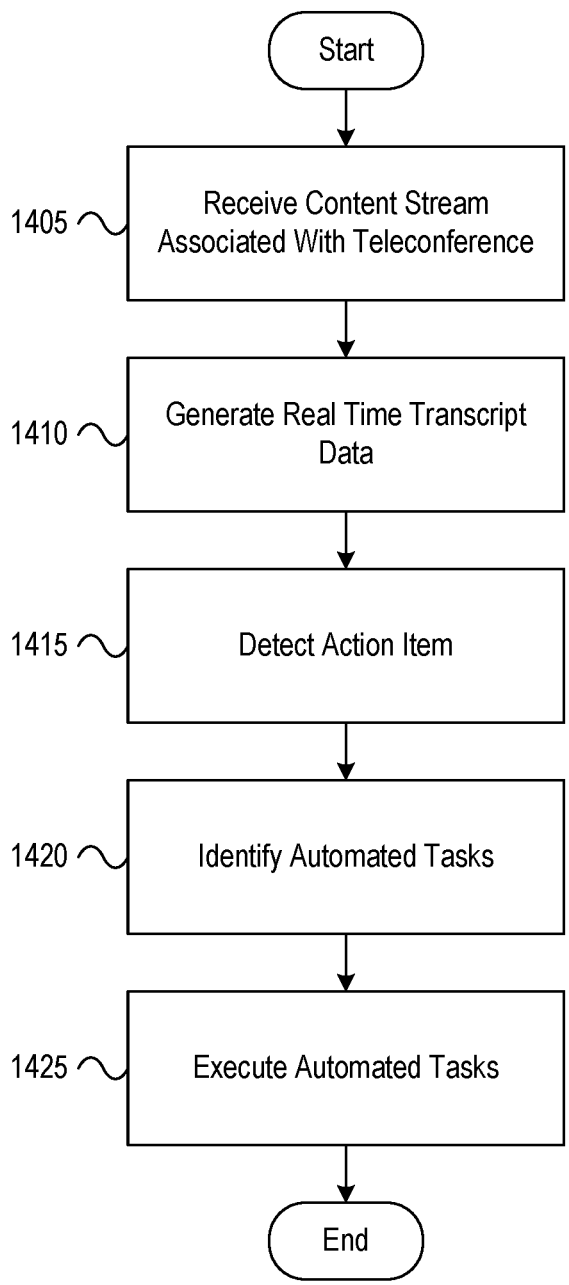
FIG. 14 depicts another illustrative method for implementing and using a data processing system with a machine learning engine to provide automated collaboration assistance functions in accordance with one or more example embodiments.

FIG. 14 depicts another illustrative method for implementing and using a data processing system with a machine learning engine to provide automated collaboration assistance functions in accordance with one or more example embodiments. Referring to FIG. 14, at step 1405, a computing platform having at least one processor, a memory, and a communication interface may receive, via the communication interface, from a teleconference hosting computer system, a first content stream associated with a first teleconference. At step 1410, responsive to receiving the first content stream associated with the first teleconference from the teleconference hosting computer system, the computing platform may generate, based on a machine learning dataset, first real-time transcript data comprising a real-time textual transcript of the first teleconference. At step 1415, the computing platform may detect, during the first teleconference, based on the first real-time transcript data comprising the real-time textual transcript of the first teleconference, a first action item associated with the first teleconference. At step 1420, responsive to detecting the first action item associated with the first teleconference, the computing platform may identify, based on the machine learning dataset, one or more automated tasks associated with the first action item associated with the first teleconference. At step 1425, responsive to identifying the one or more automated tasks associated with the first action item associated with the first teleconference, the computing platform may execute the one or more automated tasks associated with the first action item associated with the first teleconference.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from a teleconference hosting computer system, a first content stream associated with a first teleconference;
      responsive to receiving the first content stream associated with the first teleconference from the teleconference hosting computer system, generate, based on a machine learning dataset, first real-time transcript data comprising a real-time textual transcript of the first teleconference;
      receive a request for a summary of the first teleconference;
      responsive to receiving the request for the summary of the first teleconference, generate, based on the first real-time transcript data comprising the real-time textual transcript of the first teleconference, a summary report of the first teleconference;
      based on generating the summary report of the first teleconference, send, via the communication interface, the summary report of the first teleconference to one or more recipient devices;
      generate one or more reminders associated with one or more action items being tracked by a selectable tracking service executed on the computing platform;
      send, via the communication interface, the one or more reminders associated with the one or more action items being tracked by the selectable tracking service executed on the computing platform to at least one recipient device;
      identify a completion status of at least one item being tracked by the selectable tracking service executed on the computing platform based on item status information received by the computing platform from one or more user devices;
      responsive to identifying the completion status of the at least one item being tracked by the selectable tracking service executed on the computing platform, provide a status report to at least one user device;
      detect, during the first teleconference, based on the first real-time transcript data comprising the real-time textual transcript of the first teleconference, a first action item associated with the first teleconference;
      responsive to detecting the first action item associated with the first teleconference, identify, based on the machine learning dataset, one or more automated tasks associated with the first action item associated with the first teleconference; and
      responsive to identifying the one or more automated tasks associated with the first action item associated with the first teleconference, execute the one or more automated tasks associated with the first action item associated with the first teleconference.

2. The computing platform of claim 1, wherein receiving the first content stream associated with the first teleconference from the teleconference hosting computer system comprises receiving, from the teleconference hosting computer system, audio data associated with the first teleconference, video data associated with the first teleconference, and chat data associated with the first teleconference.

3. The computing platform of claim 2, wherein the machine learning dataset comprises organization-specific vocabulary information, team-specific vocabulary information, and individual-specific speech pattern information.

4. The computing platform of claim 3, wherein generating the first real-time transcript data comprises:
   processing the audio data associated with the first teleconference to identify one or more speakers participating in the first teleconference;
   writing transcript text identifying the one or more speakers participating in the first teleconference and words being spoken by the one or more speakers participating in the first teleconference based on the organization-specific vocabulary information, the team-specific vocabulary information, and the individual-specific speech pattern information; and
   inserting timestamp data, speaker metadata, and topic metadata into the first real-time transcript data.

5. The computing platform of claim 1, wherein receiving the request for the summary of the first teleconference comprises receiving the request for the summary of the first teleconference from a participant of the first teleconference while the first teleconference is in progress.

6. The computing platform of claim 1, wherein receiving the request for the summary of the first teleconference comprises receiving the request for the summary of the first teleconference after the first teleconference has concluded.

7. The computing platform of claim 1, wherein receiving the request for the summary of the first teleconference comprises receiving the request for the summary of the first teleconference from the teleconference hosting computer system based on the first teleconference being terminated.

8. The computing platform of claim 1, wherein generating the summary report of the first teleconference comprises generating the summary report of the first teleconference based on one or more summary preferences specifying a target length for the summary report of the first teleconference, one or more prioritized topics for the summary report of the first teleconference, and one or more prioritized speakers for the summary report of the first teleconference.

9. The computing platform of claim 1, wherein sending the summary report of the first teleconference to one or more recipient devices comprises sending the summary report of the first teleconference to the teleconference hosting computer system.

10. The computing platform of claim 1, wherein sending the summary report of the first teleconference to one or more recipient devices comprises sending the summary report of the first teleconference to one or more email recipient user devices.

11. The computing platform of claim 1, wherein the memory stores additional computer-readable instructions that, when executed by the at least one processor, cause the computing platform to:
   detect, during the first teleconference, a live selection of the selectable tracking service executed on the computing platform; and
   based on detecting the live selection of the selectable tracking service executed on the computing platform, perform one or more live selection actions.

12. The computing platform of claim 1, wherein the memory stores additional computer-readable instructions that, when executed by the at least one processor, cause the computing platform to:
   detect, during the first teleconference, a request for a live status report from the selectable tracking service executed on the computing platform; and
   based on detecting the request for the live status report from the selectable tracking service executed on the computing platform, provide live status report information associated with one or more action items being tracked by the selectable tracking service executed on the computing platform.

13. The computing platform of claim 1, wherein the memory stores additional computer-readable instructions that, when executed by the at least one processor, cause the computing platform to:
   after generating the summary report of the first teleconference:
      validate the summary report of the first teleconference generated by the computing platform; and
      update the machine learning dataset based on validating the summary report of the first teleconference generated by the computing platform.

14. The computing platform of claim 1, wherein executing the one or more automated tasks associated with the first action item associated with the first teleconference comprises generating at least one suggested email response, filling out at least one form document, communicating with at least one external service provider using an application programming interface, or communicating with at least one internal portal to submit one or more internal requests.

15. The computing platform of claim 14, wherein the memory stores additional computer-readable instructions that, when executed by the at least one processor, cause the computing platform to:
   after executing the one or more automated tasks associated with the first action item associated with the first teleconference:
      validate execution of the one or more automated tasks associated with the first action item associated with the first teleconference; and
      update the machine learning dataset based on validating the execution of the one or more automated tasks associated with the first action item associated with the first teleconference.

16. A method, comprising:
   at a computing platform comprising at least one processor, memory, and a communication interface:
      receiving, by the at least one processor, via the communication interface, from a teleconference hosting computer system, a first content stream associated with a first teleconference;
      responsive to receiving the first content stream associated with the first teleconference from the teleconference hosting computer system, generating, by the at least one processor, based on a machine learning dataset, first real-time transcript data comprising a real-time textual transcript of the first teleconference;
      receiving, by the at least one processor, a request for a summary of the first teleconference;
      responsive to receiving the request for the summary of the first teleconference, generating, by the at least one processor, based on the first real-time transcript data comprising the real-time textual transcript of the first teleconference, a summary report of the first teleconference;
      based on generating the summary report of the first teleconference, sending, by the at least one processor, via the communication interface, the summary report of the first teleconference to one or more recipient devices;
      generating, by the at least one processor, one or more reminders associated with one or more action items being tracked by a selectable tracking service executed on the computing platform;

sending, by the at least one processor, via the communication interface, the one or more reminders associated with the one or more action items being tracked by the selectable tracking service executed on the computing platform to at least one recipient device;

identifying, by the at least one processor, a completion status of at least one item being tracked by the selectable tracking service executed on the computing platform based on item status information received by the computing platform from one or more user devices;

responsive to identifying the completion status of the at least one item being tracked by the selectable tracking service executed on the computing platform, providing, by the at least one processor, a status report to at least one user device;

detecting, by the at least one processor, during the first teleconference, based on the first real-time transcript data comprising the real-time textual transcript of the first teleconference, a first action item associated with the first teleconference;

responsive to detecting the first action item associated with the first teleconference, identifying, by the at least one processor, based on the machine learning dataset, one or more automated tasks associated with the first action item associated with the first teleconference; and responsive to identifying the one or more automated tasks associated with the first action item associated with the first teleconference, executing, by the at least one processor, the one or more automated tasks associated with the first action item associated with the first teleconference.

17. The method of claim 16, wherein receiving the first content stream associated with the first teleconference from the teleconference hosting computer system comprises receiving, from the teleconference hosting computer system, audio data associated with the first teleconference, video data associated with the first teleconference, and chat data associated with the first teleconference.

18. The method of claim 17, wherein the machine learning dataset comprises organization-specific vocabulary information, team-specific vocabulary information, and individual-specific speech pattern information.

19. One or more non-transitory computer-readable media storing instructions that, when executed by a computing platform comprising at least one processor, memory, and a communication interface, cause the computing platform to:

receive, via the communication interface, from a teleconference hosting computer system, a first content stream associated with a first teleconference;

responsive to receiving the first content stream associated with the first teleconference from the teleconference hosting computer system, generate, based on a machine learning dataset, first real-time transcript data comprising a real-time textual transcript of the first teleconference;

receive a request for a summary of the first teleconference;

responsive to receiving the request for the summary of the first teleconference, generate, based on the first real-time transcript data comprising the real-time textual transcript of the first teleconference, a summary report of the first teleconference;

based on generating the summary report of the first teleconference, send, via the communication interface, the summary report of the first teleconference to one or more recipient devices;

generate one or more reminders associated with one or more action items being tracked by a selectable tracking service executed on the computing platform;

send, via the communication interface, the one or more reminders associated with the one or more action items being tracked by the selectable tracking service executed on the computing platform to at least one recipient device;

identify a completion status of at least one item being tracked by the selectable tracking service executed on the computing platform based on item status information received by the computing platform from one or more user devices;

responsive to identifying the completion status of the at least one item being tracked by the selectable tracking service executed on the computing platform, provide a status report to at least one user device;

detect, during the first teleconference, based on the first real-time transcript data comprising the real-time textual transcript of the first teleconference, a first action item associated with the first teleconference;

responsive to detecting the first action item associated with the first teleconference, identify, based on the machine learning dataset, one or more automated tasks associated with the first action item associated with the first teleconference; and responsive to identifying the one or more automated tasks associated with the first action item associated with the first teleconference, execute the one or more automated tasks associated with the first action item associated with the first teleconference.

* * * * *